(12) United States Patent
Melbourne et al.

(10) Patent No.: US 11,678,604 B1
(45) Date of Patent: Jun. 20, 2023

(54) SMART LAWNMOWER WITH DEVELOPMENT OF MOWING POLICY AND SYSTEM AND METHOD FOR USE OF SAME

(71) Applicant: Sensori Robotics, LLC, Dallas, TX (US)

(72) Inventors: Ross A. Melbourne, Southlake, TX (US); David J. Melbourne, Arlington, TX (US)

(73) Assignee: Sensori Robotics, LLC, Dallas, TX (US)

( * ) Notice: Subject to any disclaimer, the term of this patent is extended or adjusted under 35 U.S.C. 154(b) by 0 days.

(21) Appl. No.: 18/069,378

(22) Filed: Dec. 21, 2022

(51) Int. Cl.
*A01D 34/00* (2006.01)
*G05B 13/02* (2006.01)
(Continued)

(52) U.S. Cl.
CPC ....... *A01D 34/008* (2013.01); *G05B 13/0265* (2013.01); *G05D 1/0044* (2013.01);
(Continued)

(58) Field of Classification Search
None
See application file for complete search history.

(56) References Cited

U.S. PATENT DOCUMENTS

| | | | |
|---|---|---|---|
| 10,060,827 | B2 | 8/2018 | Schnell et al. |
| 11,076,529 | B2 | 8/2021 | Chen et al. |

(Continued)

FOREIGN PATENT DOCUMENTS

| | | |
|---|---|---|
| CN | 107305678 | 10/2017 |
| CN | 108781705 | 11/2018 |

(Continued)

OTHER PUBLICATIONS

Liao, J.-C.; Chen, S.-H.; Zhuang, Z.-Y.; Wu, B.-W.; Chen, Y.-J. Designing and Manufacturing of Automatic Robotic Lawn Mower. Processes 2021, 9, 358. https://doi.org/10.3390/pr9020358.

(Continued)

*Primary Examiner* — Adam D Tissot
*Assistant Examiner* — Garrett F Evans
(74) *Attorney, Agent, or Firm* — Scott Griggs; Griggs Bergen

(57) ABSTRACT

A smart lawnmower and system and method for use of the same are disclosed. In one embodiment of the smart lawnmower, in a real world-to-simulated world ("real-to-sim") training phase, the smart lawnmower constructs a simulated environment corresponding to a mowing-relevant portion of a real-world environment relative to semantic information, which may include received location signalization at an antenna In a simulated world-to-real world ("sim-to-real") mowing phase, a mowing policy is applied to control the cutting subsystem and the drive subsystem in response to the semantic information, which may include the location signalization. In each of the real-to-sim training phase and the sim-to-real mowing phase, the smart lawnmower may provide a user interface including the simulated environment. Further, in the sim-to-real mowing phase, the smart lawnmower may synchronize the real world and the simulated world.

20 Claims, 14 Drawing Sheets

(51) Int. Cl.
*G05D 1/00* (2006.01)
*G05D 1/02* (2020.01)
*A01D 101/00* (2006.01)

(52) U.S. Cl.
CPC ....... *G05D 1/0274* (2013.01); *A01D 2101/00* (2013.01); *G05D 2201/0208* (2013.01)

(56) References Cited

U.S. PATENT DOCUMENTS

| | | | |
|---|---|---|---|
| 2012/0303202 A1* | 11/2012 | Durkos | G05D 1/0246 |
| | | | 701/25 |
| 2013/0282224 A1* | 10/2013 | Yazaki | G05D 1/0219 |
| | | | 701/24 |
| 2016/0297070 A1* | 10/2016 | Reigo | A01D 34/008 |
| 2017/0364088 A1* | 12/2017 | Grufman | G05D 1/0246 |
| 2019/0369620 A1 | 12/2019 | Zhou et al. | |
| 2020/0159228 A1* | 5/2020 | Zhong | G05D 1/0212 |
| 2020/0275604 A1 | 9/2020 | Chen et al. | |
| 2020/0310432 A1 | 10/2020 | Ott et al. | |
| 2020/0314795 A1 | 10/2020 | Wakabayashi et al. | |
| 2020/0375095 A1 | 12/2020 | Koto et al. | |
| 2021/0018927 A1 | 1/2021 | Ackerman et al. | |
| 2021/0197855 A1 | 7/2021 | Zhang et al. | |
| 2021/0382476 A1* | 12/2021 | Morrison | G05D 1/0219 |
| 2022/0151147 A1* | 5/2022 | Chen | A01D 34/78 |
| 2022/0197295 A1* | 6/2022 | Xu | G05D 1/0219 |
| 2022/0253063 A1 | 8/2022 | Frick et al. | |

FOREIGN PATENT DOCUMENTS

| | | |
|---|---|---|
| EP | 3528213 | 8/2019 |
| WO | 2020076610 | 4/2020 |
| WO | 2021174133 | 9/2021 |
| WO | 2022120713 | 6/2022 |

OTHER PUBLICATIONS

Lin, Yong-Cheng; Development of Autonomous Robotic Lawn Mower Using Multi-Sensor Fusion Based Simultaneous Localization and Mapping; Dec. 31, 1999; https://scholars.lib.nkust.edu.tw/handle/123456789/56992.

Husqvarna Group; What Are Robotic Lawn Mowers and Why Do We Love Them?; Sep. 18, 2020; Eco-Friendly Landscaping, Turf Care; https://www.husqvarna.com/us/robotic-lawn-mowers/.

Husqvarna Group; How Husqvarna is reaching more customers with IoT; May 2017; https://www.husqvarna.com/us/robotic-lawn-mowers/.

Eugene Demaitre; Graze announces next-generation autonomous robot for commercial lawn mowing; Sep. 1, 2020; https://www.therobotreport.com/graze-announces-new-autonomous-robot-commercial-lawn-mowing/.

\* cited by examiner

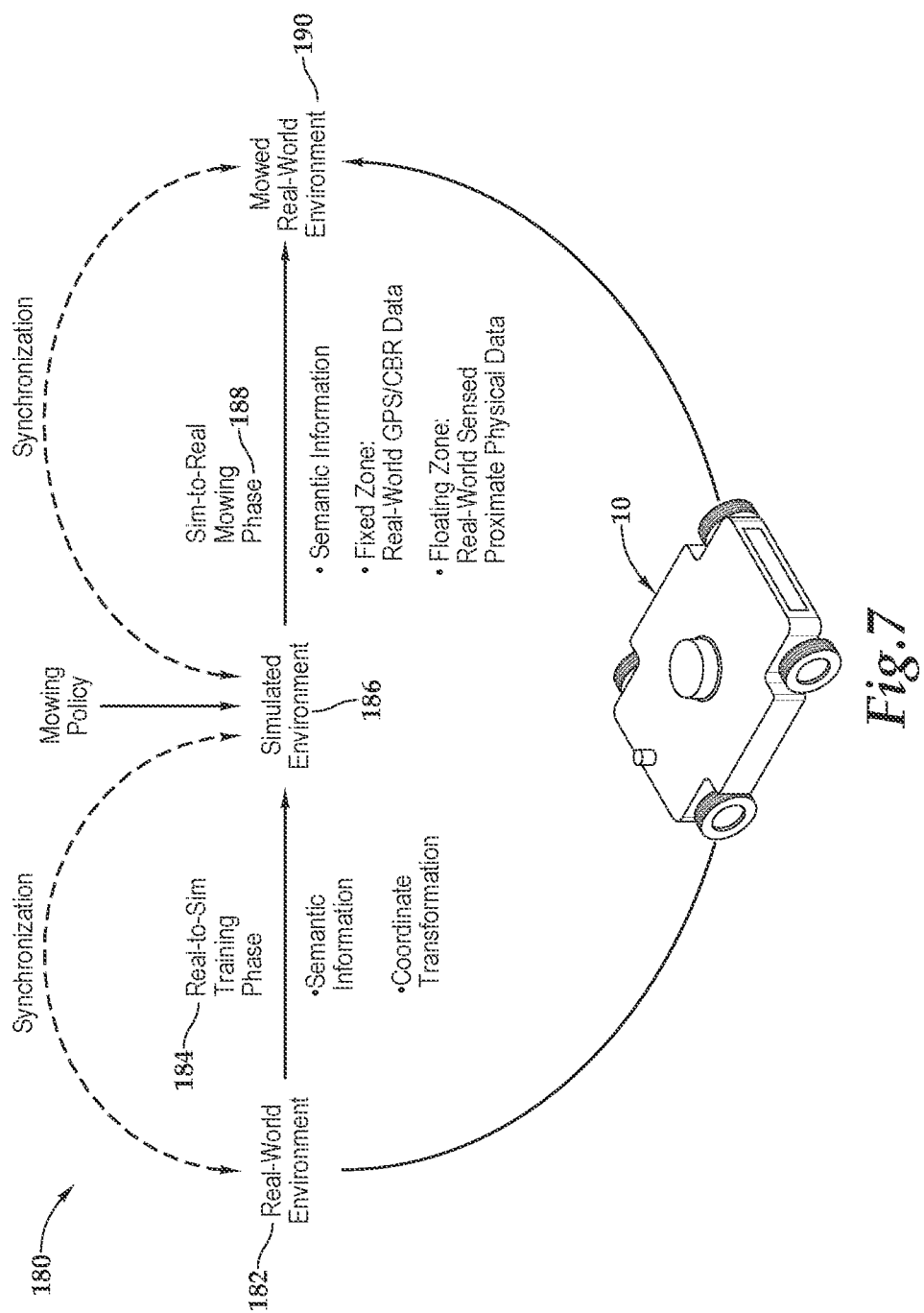

SMART LAWNMOWER WITH DEVELOPMENT OF MOWING POLICY AND SYSTEM AND METHOD FOR USE OF SAME

PRIORITY STATEMENT & CROSS-REFERENCE TO RELATED APPLICATIONS

This application discloses subject matter related to the subject matter disclosed in the following commonly owned, co-pending application: (1) U.S. patent application Ser. No. 18/069,412 entitled "Smart Lawnmower with Realization of Mowing Policy and System and Method for Use of Same" and filed on Dec. 21, 2022, in the names of Ross A. Melbourne, et al.; which is hereby incorporated by reference, in entirety, for all purposes.

TECHNICAL FIELD OF THE INVENTION

This invention relates, in general, to robotics and, in particular, to smart lawnmowers that autonomously mow one or more lawns with minimal human intervention, and systems and methods for use of the same that utilize a mowing policy.

BACKGROUND OF THE INVENTION

Landscaping and groundskeeping services that keep a landscape healthy, clean, safe, and attractive, employ more than 1,000,000 individuals in the United States alone. Such employment is manual and labor-intensive work. In other fields of endeavor, robots have been shown to be particularly suited to perform routine manual tasks. Robots have yet to sufficiently penetrate the landscaping and groundskeeping markets, however. Typical robotic smart lawnmowers use randomness and sheer persistence to mow grass. This approach has not proven to be sufficiently efficient and effective to penetrate the landscaping and groundskeeping markets. As a result, there is a need for improved smart lawnmowers.

SUMMARY OF THE INVENTION

It would be advantageous to provide a robotic smart lawnmower that is sufficiently efficient and effective to mow grass. It would also be desirable to enable a computer-based and mechanical-based solution that is easily and reliably deployed to mow multiple lawns. To better address one or more of these concerns, a smart lawnmower and systems and methods for use of the same are disclosed. In one embodiment of the smart lawnmower, in a real world-to-simulated world ("real-to-sim") training phase, the smart lawnmower constructs a simulated environment corresponding to a mowing-relevant portion of a real-world environment relative to semantic information, which may include received location signalization utilizing at least one antenna. In a simulated world-to-real world ("sim-to-real") mowing phase, a mowing policy is applied to control the cutting subsystem and the drive subsystem in response to the semantic information, which may include the location signalization. In each of the real-to-sim training phase and the sim-to-real mowing phase, the smart lawnmower provides a user interface including the simulated environment.

In another embodiment of the smart lawnmower, in a real-to-sim training phase, the smart lawnmower constructs a simulated environment corresponding to a mowing-relevant portion of a real-world environment relative to semantic information, which may include received location signalization utilizing at least one antenna. In a sim-to-real mowing phase, a mowing policy is applied to control the cutting subsystem and the drive subsystem in response to the semantic information, with the sim-to-real mowing phase being synchronized with the real world by receiving the real-world inputs, e.g., the semantic information, which may include the location signalization. A system and method, which accompany the smart lawnmower, are also disclosed. This smart lawnmower, along with the system and method and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 7 is a flow phase diagram depicting one embodiment of a method utilizing a smart lawnmower, according to the teachings presented herein.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of several specific ways to make and use the invention, and do not delimit the scope of the present invention.

Figure 1:
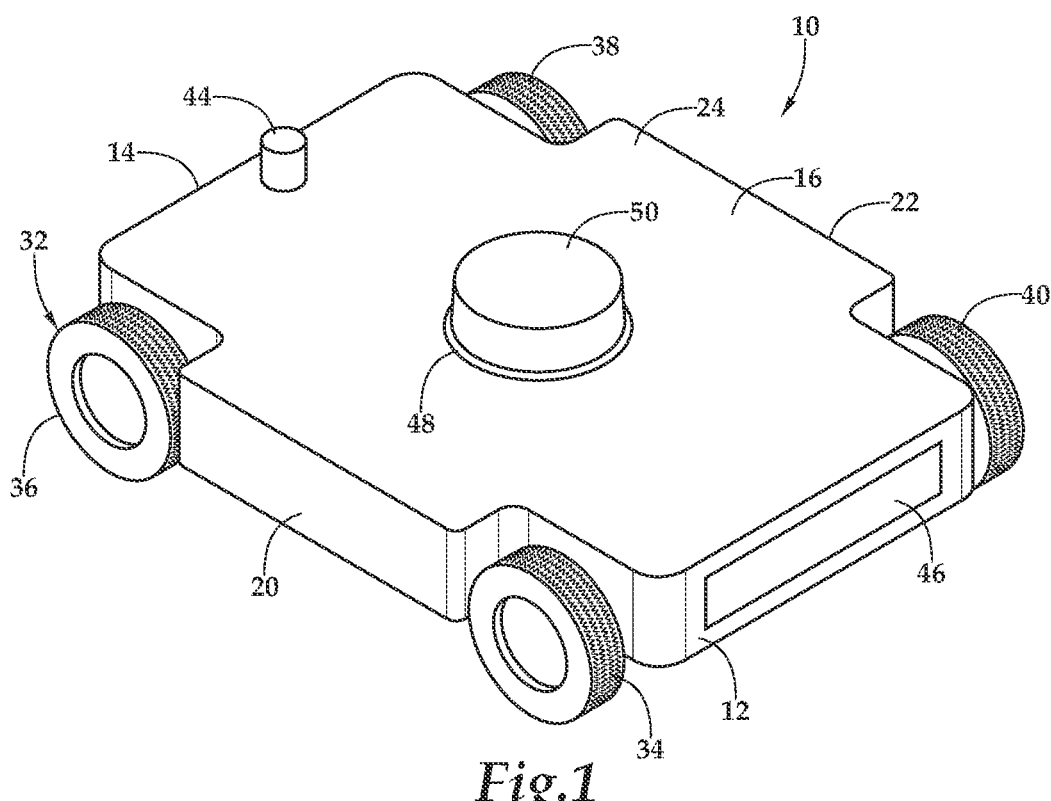
FIG. 1 is a top perspective view of one embodiment of a smart lawnmower, according to the teachings presented herein.
Figure 2:
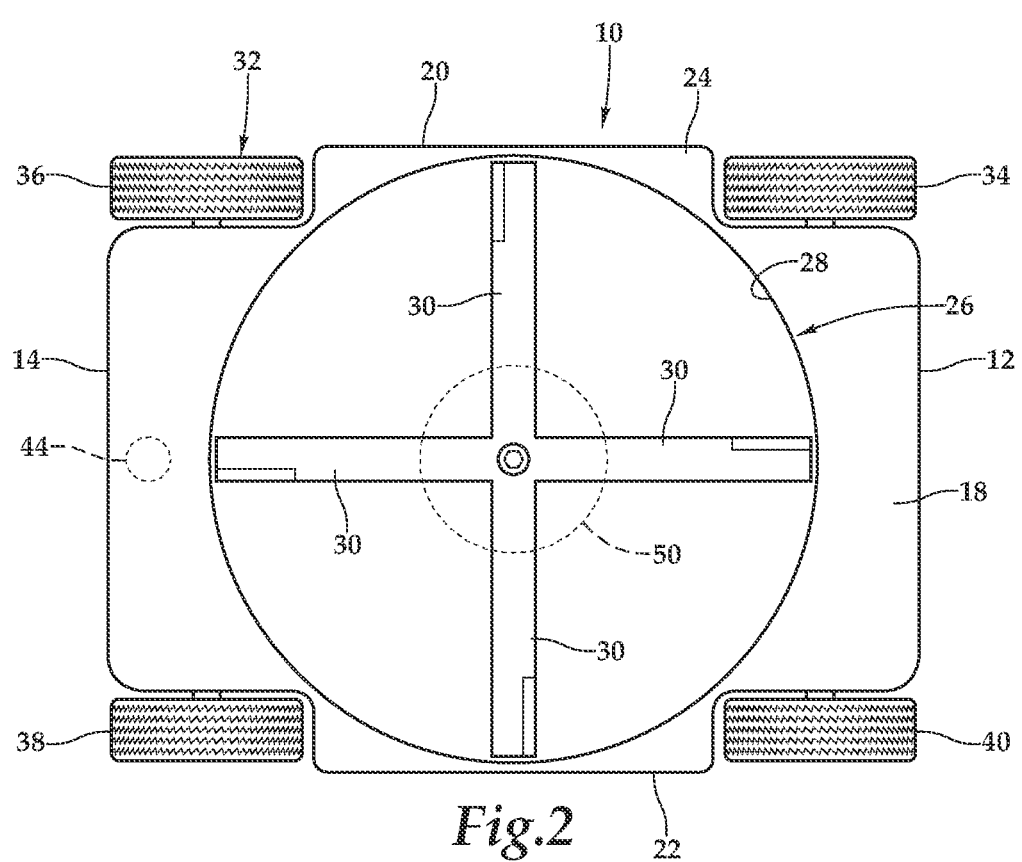
FIG. 2 is a bottom plan view of the smart lawnmower depicted in FIG. 1.

Referring initially to FIG. 1 and FIG. 2, therein is depicted one embodiment of a smart lawnmower, which autonomously mows lawns, that is schematically illustrated and generally labeled 10. The smart lawnmower 10 includes a front 12, a rear 14, an upper surface 16, a lower surface 18, a right side 20, and a left side 22. A housing 24 forms an exterior of the smart lawnmower 10. A cutting subsystem 26 is secured to the housing 24 on the lower surface 18 of the smart lawnmower 10. As shown, the cutting subsystem 26 includes an opening 28 having blades 30 for cutting grass thereat. A drive subsystem 32 is secured to the housing 24 to provide locomotion and steering of the smart lawnmower 10. As shown, the drive subsystem 32 includes wheels 34, 36, 38, 40, which are supported by one or more motors (not shown) and other conventional components. Although four wheels 34, 36, 38, 40 are shown with a particular configuration, it should be appreciated that the drive subsystem 32 may include any number and configuration of wheels. By way of example and not by way of limitation, the drive subsystem 32 may include three wheels with two rear-drive wheels and one front caster wheel.

Although any number of antennas may be utilized in any external or internal location, in the illustrated embodiment, as an example, an antenna 44 is secured to the housing 24 and located in a known spaced relationship to the cutting subsystem 26 and, in particular, the blades 30. Further, in some embodiments, which may have more than one antenna, the multiple antennas are spaced equidistance about the cutting subsystem 26 and, in particular, the blades 30. In some embodiments, the antenna 44 is a Global Navigation Satellite System (GNSS) antenna or the antenna 44 is a carrier-based ranging antenna. In other embodiments, the antenna 44 is a WiFi transceiver. It should be appreciated, however, that the antenna 44 may also be enabled by a variety of wireless methodologies, including, but not limited to, 802.11, 3G, 4G, Edge, ZigBee, near field communications (NFC), and Bluetooth, for example. Further, the antenna 44 may communicate with a local base station or local server, and/or communicate with remote base station or remote server, for example.

In some embodiments, the GNSS antenna accesses a global navigation satellite system that uses a receiver and algorithms to provide location, velocity and time synchronization to provide location information for the smart lawnmower 10. In some other embodiments, the antenna 44 is a Real-time Kinematic (RTK) antenna that is a positioning application of surveying to correct for common errors in current satellite navigation (GNSS) systems, including GPS systems. Such an RTK antenna uses measurements of the phase of a signal's carrier wave in addition to the information content of the signal and relies on a single reference station or interpolated virtual station to provide real-time corrections, providing up to centimeter-level accuracy. With reference to GNSS in particular, the combination of the GNSS antenna and the RTK antenna in a single antenna or multiple antennas, may be considered as a carrier-phase global positioning satellite (CPGPS) enhancement system. Further, the antenna 44 may include Precise Point Positioning (PPP) signalization that may calculate very precise positions, with errors as small as a few centimeters. That is, in some embodiments, the PPP error corrections are satellite specific and thus independent of a user's location, and only a limited number of reference stations are needed around the world. Further still, it should be appreciated that the antenna 44 may include time-of-flight-based signalization.

A sensor 46 is mounted to the housing 24 at the front 12 of the smart lawnmower 10. The sensor 46 collects information about the real-world environment for the smart lawnmower 10. Although only one sensor is depicted, it should be appreciated that any number of sensors may be utilized on the smart lawnmower. Moreover, the positioning of the sensor 46 may vary from the depicted front 12 of the smart lawnmower 10. A quick-change battery terminal 48 is posited on the upper surface of the smart lawnmower 10. As shown, the quick-change battery terminal 48 accepts a rechargeable battery 50 for powering the smart lawnmower 10.

In operation, as will be described in further detail hereinbelow, the smart lawnmower 10 operates in a reality world-to-simulation training phase, i.e., a real-to-sim training phase and a simulation-to-real world mowing phase, i.e., a sim-to-real mowing phase. In the real-to-sim training phase, the smart lawnmower 10 constructs a simulated environment corresponding to a mowing-relevant portion of a real-world environment based on semantic information, which may include received location signalization from the antenna. In the sim-to-real mowing phase, a mowing policy is applied to control the cutting subsystem and the drive subsystem in response to the semantic information and the location signalization. This achieves automated mowing of the yard. In each of the real-to-sim training phase and the sim-to-real mowing phase, the smart lawnmower 10 provides a user interface including the simulated environment. Further, in the sim-to-real mowing phase, the smart lawnmower 10 synchronize the simulated environment and the real-world environment by receiving in real-time the semantic information from the real-world environment. It should be appreciated that although one architecture of the smart lawnmower 10 is provided, other architectures are within the teachings presented herein.

Figure 3:
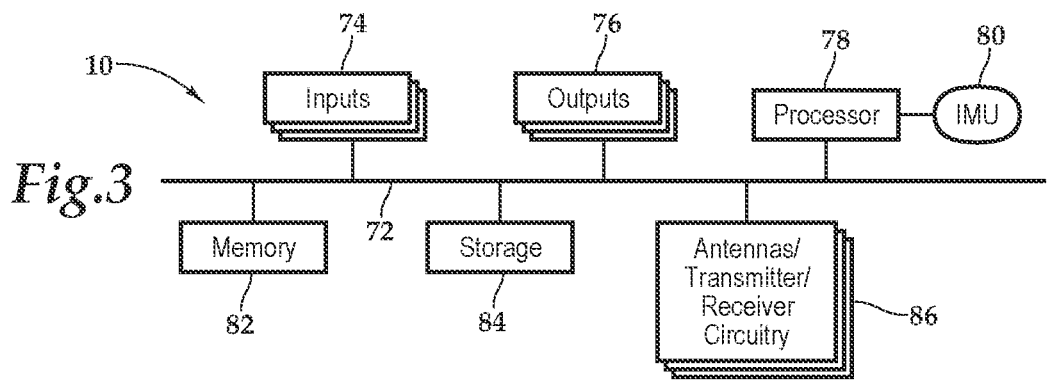
FIG. 3 is a functional block diagram of one embodiment of the smart lawnmower, depicted in FIG. 1.

FIG. 3 depicts one embodiment of the smart lawnmower 10 in which the smart lawnmower 10 is schematically depicted to include a computer-based architecture having a busing architecture 72 interconnecting inputs 74, outputs 76, a processor 78 in communication with an inertial measurement unit (IMU) 80, memory 82, storage 84, and antenna/transmitter/receiver circuitry 86 theretogether. The various inputs 74 and outputs 76 provide connections to and from the computing device, wherein the inputs 74 are the signals or data received by the smart lawnmower 10, and the outputs 76 are the signals or data sent from the smart lawnmower. The processor 78 may process instructions for execution within the computing device, including instructions stored in the memory 82 or in the storage 84, or instructions distributed locally and in a cloud, or instructions located in a cloud. That is, the data that represents the real-to-sim training phase and sim-to-real mowing phase may be stored locally at the smart lawnmower, at a server 120 (depicted in FIG. 5), such as a cloud-based server, a smart device 150 (depicted in FIG. 6), or any combination thereof. In particular, such distributed data storage may assist with mowing multiple properties by enabling replacement or swapping out of the smart lawnmower in applications like that presented in FIGS. 18A and 18B hereinbelow. The inertial measurement unit 80 provides an electronic device that measures and reports a specific force, angular rate, or orientation, using a combination of accelerometers, gyroscopes, or sometimes magnetometers, for example. The memory 82 stores information within the computing device. In one implementation, the memory 82 is a volatile memory unit or units. In another implementation, the memory 82 is a non-volatile memory unit or units. The storage 84 provides capacity that is capable of providing mass storage for the smart lawnmower 10. The antenna/transmitter/receiver circuitry 86 provides an electronic device which is a combination of radio transmitter and receiver elements to enable wireless communication and may support an antenna, transmitter, receiver, or transceiver, for example.

The memory 82 includes processor-executable instructions that, when executed cause the processor 78 to execute instructions for autonomously mowing lawns. By way of example and not by way of limitation, in one embodiment, the memory 82 may include first processor-executable instructions that in a real-to-sim training phase, construct a simulated environment corresponding to a mowing-relevant portion of a real-world environment. Semantic information, which may include received location signalization via the antenna 44, inform construction of the simulated environment. In some embodiments, the semantic information may also be information that the smart lawnmower 10 has about the real-world environment via at least one of the inertial measurement unit 80, the sensor 46, and user input, for example. The location signalization includes, for example, the previously discussed GNSS and carrier-based ranging signals or WiFi-based signals received at the antenna 44 or antennas, if the smart lawnmower 10 has more than one antenna. The processor-executable instructions further, upon the creation of the simulated environment, apply a mowing policy to the simulated environment. The mowing policy may include a designation within the simulated environment of at least one of a fixed zone and a floating zone. The fixed zone may be an area in the simulated environment corresponding to an area in the real-world environment having reception of the location signalization. That is, in some embodiments, the fixed zone corresponds to a zone of high position accuracy. In the fixed zone, reception at the antennas 44 is present. The floating zone may be an area in the simulated environment corresponding to an area in the real-world environment having diminished reception or having diminished reception of the location signalization. That is, in some embodiments, the floating zone corresponds to a zone of low confidence with respect to accuracy. Typically, the floating zone does not include reception at the antenna 44. By way of example and not by way of limitation, high position accuracy may be approximately 2-10 centimeters (approximately 0.78-4 inches). On the other hand, low confidence in the position accuracy may be approximately 30 centimeters to 3 meters (approximately 12 inches to 3.2 yards). The processor-executable instructions may also, in a sim-to-real mowing phase, apply the mowing policy to control the cutting subsystem 26 and the drive subsystem 32 in response to the semantic information and the location signalization.

In one embodiment, the memory 82 may include second processor-executable instructions that, when executed by the processor 78, cause the processor 78 upon reaching a threshold of turning movements executed by the drive subsystem 32, stop in a fixed zone. The processor 78 is then caused to receive location signalization at the antenna 44 before determining a location based on the location signalization, where, in some embodiments, due to the positioning of the antenna 44, the location is calculated, which in some embodiments, is coincidental to the cutting subsystem 26 or has a known relationship to the cutting subsystem 26. The processor 78 is then caused to calibrate the inertial measurement unit 80 based on the location. In some embodiments utilizing only one antenna, antenna 44, to calibrate the inertial measurement unit 80, upon reaching a threshold of turning movements executed by the drive subsystem 32, the processor-executable instructions cause the processor 78 to record a first position in a fixed zone at a first location. Then, the processor is caused to record a second position in the fixed zone at a second location before the processor calibrates the inertial measurement unit based on a heading derived from the first position and the second position. In another embodiment, the memory 82 further comprises third processor-executable instructions that, when executed, cause the processor to render the simulated environment including simulated representations of physical objects in the real-world environment and then place the smart lawnmower 10 at the location in the simulated environment. The drive subsystem 32 is then controlled by the processor 78 based on the location of the cutting subsystem 26 in the simulated environment.

In still another embodiment, the memory 82 further includes fourth processor-executable instructions that, when executed, cause the processor 78 to record a boundary as the drive subsystem 32 undertakes locomotion and steering of the smart lawnmower 10. These processor-executable instructions further cause the processor 78 to update the simulated environment with obstructions detected by the sensor 46. In a still further embodiment, the memory 82 further comprises fifth processor-executable instructions that, when executed, cause the processor to provide a user interface 100 (depicted in FIG. 4) including the simulated environment. The processor-executable instructions may further cause the processor 78 to utilize a viewpoint function in the user interface 100 to navigate the simulated environment and select a mowing pattern, which may be a custom mowing pattern, and then request a user verify an appearance of the selected mowing pattern using a viewpoint function. The processor-executable instructions of the smart lawnmower 10 may further comprise sixth processor-executable instructions that, when executed, cause the processor 78 to design an edging and trimming plan within the simulated environment in response to user input and output the edging and trimming plan.

In a still further embodiment, the memory 82 further comprises sixth processor-executable instructions that, when executed, cause the processor 78 to, in a real-to-sim training phase, construct a simulated environment corresponding to a mowing-relevant portion of a real-world environment relative to semantic information. As previously discussed, the semantic information is information that the smart lawnmower has about the real-world environment via at least one of the sensor, the user input, and the location signalization from the antenna, for example. The processor-executable instructions then cause the processor 78 to, in the sim-to-real mowing phase, synchronize the simulated environment and the real-world environment by receiving in real-time the semantic information from the real-world environment.

Upon the creation of the simulated environment, the processor-executable instructions may then cause the processor 78 to apply a mowing policy to the simulated environment to control the cutting subsystem 26 and the drive subsystem 32 in the real-world environment. In some embodiments, as previously discussed, the mowing policy includes a designation within the simulated environment of at least one of a fixed zone and a floating zone. The fixed zone may be an area in the simulated environment corresponding to an area in the real-world environment having a high confidence in the position with reception of the location signalization. The floating zone, on the other hand, may be an area in the simulated environment corresponding to an area in the real-world environment having a low confidence in the position and having diminished reception of the location signalization.

The processor-executable instructions presented hereinabove with FIG. 3 include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. The processor-executable instructions, the associated data structures, and the program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Figure 4:
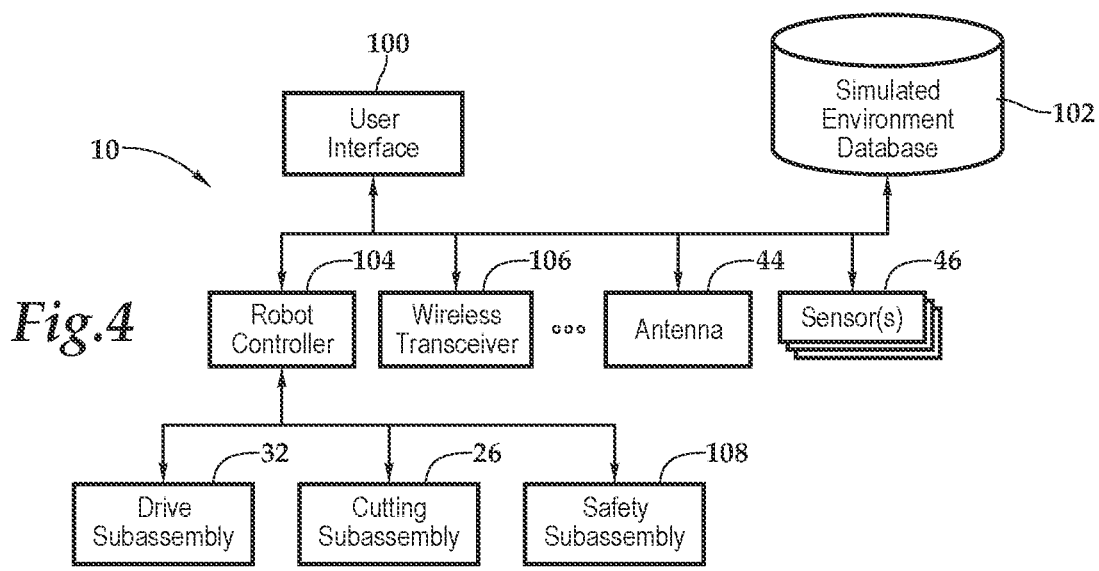
FIG. 4 is a functional block diagram of one embodiment of the smart lawnmower in additional detail.

FIG. 4 depicts one embodiment of the smart lawnmower 10 and the control signals associated therewith, which may be deployed across the computer-based architecture shown in FIG. 3, for example. The illustrated components coordinate the various functions and operations of the smart lawnmower 10. The user interface 100, a simulated environment database 102, a robot controller 104, a wireless transceiver 106, the antenna 44, and the sensor 46 are interconnected. The drive subsystem 32, the cutting subsystem 26, and a safety subsystem 108 are connected to the robot controller 104. As indicated by the ellipses between the wireless transceiver 106 and the antenna 44, any number of combination of transceivers and antennas may be employed including receivers and/or transmitters.

The user interface 100 provides user control and interaction with the smart lawnmower 10. The user interface 100 may utilize icons in conjunction with labels and/or text to provide navigation and a full representation of the information and actions available to the operator. In addition to training operations and mowing operations, user interactions may be related to maintenance, repair and other routine actions which keep the smart lawnmower 10 in working order or prevent trouble from arising.

The simulated environment database 102 includes data about the simulated environment, present and historical, corresponding to a mowing-relevant portion of the real-world environment, semantic information, and location, for example. The robot controller 104, which may be a form of on-board logic controller, coordinates overall operation and switches between various modes of operation including manual and automatic. The robot controller 104 also provides for the high-level calculation and coordination required during automatic operation for items such as the operation of the blades 30 and steering angle calculations during automatic navigation. Further, the robot controller 104 controls the motions of the smart lawnmower 10 through built in inputs 74 and outputs 76 wired respectively to the drive subsystem 32 and the cutting subsystem 26.

The wireless transceiver 106 provides communication between various smart devices or a cloud server, for example, and the smart lawnmower 10 may be enabled by a variety of wireless methodologies employed by the wireless transceiver 106, including 802.11, 3G, 4G, Edge, Wi-fi, ZigBee, near field communications (NFC), Bluetooth low energy, and Bluetooth, for example. The operation of the antenna 44 and the sensor 46, which may include sensors, was previously discussed. The safety subsystem 108 ensures safe operation of the smart lawnmower 10, in particular, with respect to the cutting subsystem 26 and the associated blades 30. It should be appreciated that although the particular busing architecture 72 is presented for the control of the smart lawnmower 10, other architectures are within the teachings of the present invention. By way of example, any combination of hardware, software, and firmware may be employed. By way of further example, the distribution of control may differ from that presented herein.

Figure 5:
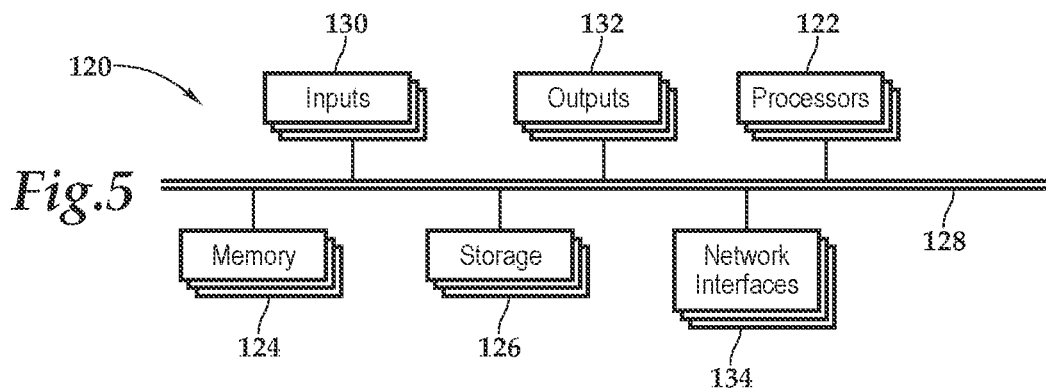
FIG. 5 is a functional block diagram depicting one embodiment of a server, which may be utilized with the smart lawnmower.

Referring now to FIG. 5, one embodiment of the server 120, which may be a cloud server, as a computing device includes, within a housing, a processor 122, memory 124, and storage 126 interconnected with various busing architectures 128 in a common or distributed, for example, mounting architecture that also supports inputs 130, outputs 132, and network interfaces 134. In other implementations, in the computing device, multiple processors and/or multiple busing architectures may be used, as appropriate, along with multiple memories and types of memory. Further still, in other implementations, multiple computing devices may be provided and operations distributed therebetween. The processor 122 may process instructions for execution within the server 120, including instructions stored in the memory 124 or in the storage 126. The memory 124 stores information within the computing device or cloud server, for example. In one implementation, the memory 124 is a volatile memory unit or units. In another implementation, the memory 124 is a non-volatile memory unit or units. The storage 126 includes capacity that is capable of providing mass storage for the server 120, including simulated environment database storage capacity. The various inputs 130 and outputs 132 provide connections to and from the server 120, wherein the inputs 130 are the signals or data received by the server 120, and the outputs 132 are the signals or data sent from the smart lawnmower 10. The network interfaces 134 provide the necessary device controller or controllers to connect the server 120 to one or more networks, such as the Internet, for example.

The memory 124 is accessible to the processor 122 and includes processor-executable instructions that, when executed, cause the processor 122 to execute a series of operations. The processor-executable instructions cause the processor 122 to provide an interface for an off-site owner or operator of one or more of the smart lawnmowers. The processor-executable instructions also cause the processor 122 to maintain the simulated environment database 102 in the storage 156. The processor 122 is caused to receive data about the smart lawnmower 10 from the smart lawnmower 10 and append the data to the simulated environment database 102. In one embodiment, following the receipt of the data, the server 120 is caused via the processor 122 to evaluate the performance of the smart lawnmower 10. The processor-executable instructions may cause the server 120 to generate a report. Further, it should be appreciated the processor-executable instructions presented in FIG. 3 may be distributed between the smart lawnmower 10 and the server 120, which may be a cloud-based server.

The processor-executable instructions presented hereinabove with FIG. 5 include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Figure 6:
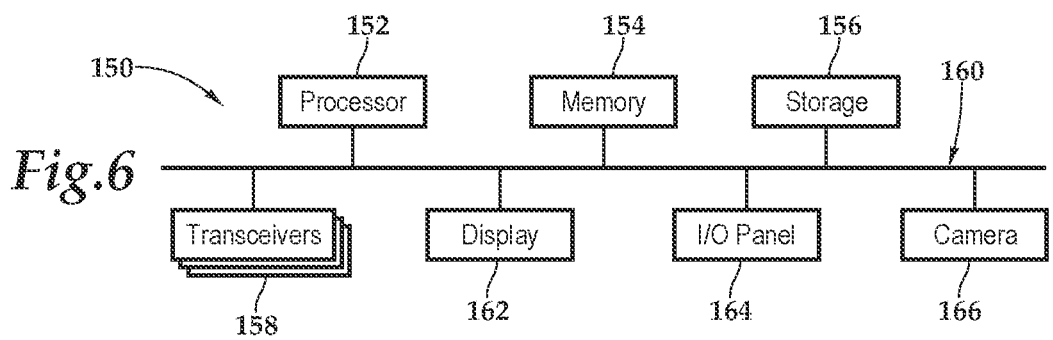
FIG. 6 is a functional block diagram depicting one embodiment of a smart phone, which may be utilized with the smart lawnmower, depicted in FIG. 1.

Referring now to FIG. 6, the smart device 150 may be a wireless communication device of the type including various fixed, mobile, and/or portable devices. To expand rather than limit the discussion of the smart device 150, such devices may include, but are not limited to, cellular or mobile smart phones, tablet computers, smartwatches, laptop computers, computers, a game controller, and so forth. The smart device 150 may include a processor 152, memory 154, storage 156, and multiple transceivers 158 interconnected by a busing architecture 160 that also supports a display 162, I/O panel 164, and a camera 166. It should be appreciated that although a particular architecture is explained, other designs and layouts are within the teachings presented herein.

In operation, the teachings presented herein permit the smart device 150, such as a smartphone, to form a pairing with the smart lawnmower 10 and operationally influence the smart lawnmower 10. As shown, the smart device 150 includes the memory 154 accessible to the processor 152 and the memory 154 includes processor-executable instructions that, when executed, cause the processor 152 to provide an interface for an operator that includes an interactive application for viewing the status of the smart lawnmower 10. The processor 152 is caused to present a menu for controlling the smart lawnmower 10. The processor 152 is then caused to receive an interactive instruction from the user and forward a control signal via the wireless transceiver or transceivers 158, for example, to implement the instruction at the smart lawnmower 10. The processor 152 may also be caused to generate various reports about the operation of the smart lawnmower 10.

The memory 154 and storage 156 are accessible to the processor 152 and include processor-executable instructions that, when executed, cause the processor 152 to execute a series of operations. In a first series of operations, the processor-executable instructions cause the processor 152 to send and receive data with respect to the smart lawnmower 10. The data may include operational data or a mowing session, for example. Further, the processor-executable instructions presented with respect to the smart lawnmower 10 in FIG. 3 may be distributed between the smart lawnmower 10 and the smart device 150. Further still, the processor-executable instructions with respect to the smart lawnmower 10 in FIG. 3 and the server 120 in FIG. 5 may be distributed between the smart lawnmower 10, the server 120, and the smart device 150.

The processor-executable instructions presented hereinabove with FIG. 6 include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Referring now to FIG. 7, a flow phase diagram 180 depicting one embodiment of a method utilizing the smart lawnmower 10. At block 182, a real-world environment having a mowing-relevant portion is identified. At block 184, in a real-to-sim training phase, the smart device constructs a simulated environment corresponding to the mowing-relevant portion of the real-world environment. This construction is based on semantic information, which as discussed, may include received location signalization at the antenna. More generally, the semantic information is information that the smart lawnmower 10 has about the real-world environment via at least one of the sensor, user input, and location signalization from the antenna. As shown in FIG. 7, in some embodiments, the semantic information is received at the smart lawnmower 10 in substantially real-time to synchronize the real-world environment and the simulated environment.

At block 186, a simulated environment is created that includes fixed zones and floating zones. As discussed, fixed zones are areas within the real-world environment where a high confidence of position exists and the floating zones are areas within the real-world environment where a low confidence in position exists. Also at block 186, at upon the creation of the simulated environment, a mowing policy is applied to the simulated environment. The mowing policy may include a designation within the simulated environment of at least one of the fixed zone and the floating zone. The mowing policy may also include a mowing pattern or a mowing pattern that avoids ruts based on previously selected mowing patterns. At block 188, in a sim-to-real mowing phase, the smart lawnmower 10 applies the mowing policy to control the cutting subsystem and the drive subsystem in response to the semantic information and the location signalization. Then, at block 190, the real-world environment is mowed. As shown in FIG. 7, in some embodiments, the semantic information is received at the smart lawnmower 10 in substantially real-time to synchronize the real-world environment and the simulated environment. By way of further elaboration, at block 190, as the real-world environment is mowed, the smart lawnmower 10 receives the semantic information from the real-world and makes decisions in the simulated environment on movement and mowing using the semantic information as inputs into the decision making.

Referring now to FIG. 8A through FIG. 16B, an exemplary use case for the smart lawnmower 10 is presented. More particularly, in FIG. 8A, a real-world environment 200 is shown in an operational embodiment prior to a real-to-sim training phase. A lawn 202 includes a body 204 and an island 206. Also, a flower garden 208 is position in the body 204. A building 210 having shrubs 212 is adjacent to the lawn 202. An electronic boundary wire 214 is positioned underground near a panhandle portion 216 of the lawn 202. Although the electronic boundary wire 214 is shown only around the panhandle portion 216, it should be appreciated that the boundary wire 214 may extend around the entirety of the lawn 202.

Figure 8A:
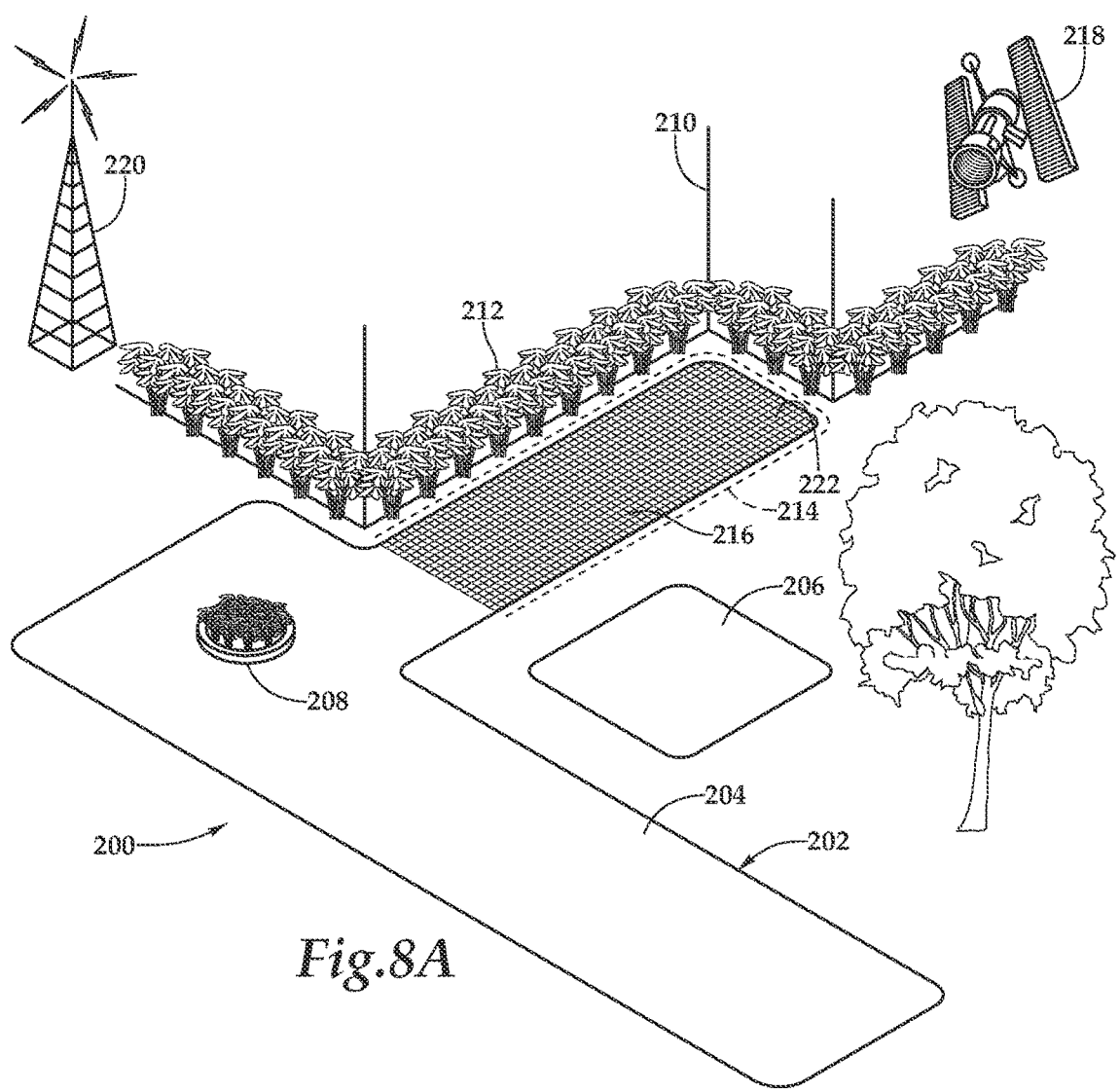
FIG. 8A is a schematic diagram of a real-world environment in a first stage of operation prior to a real-to-sim training phase, according to the teachings presented herein.
Figure 8B:
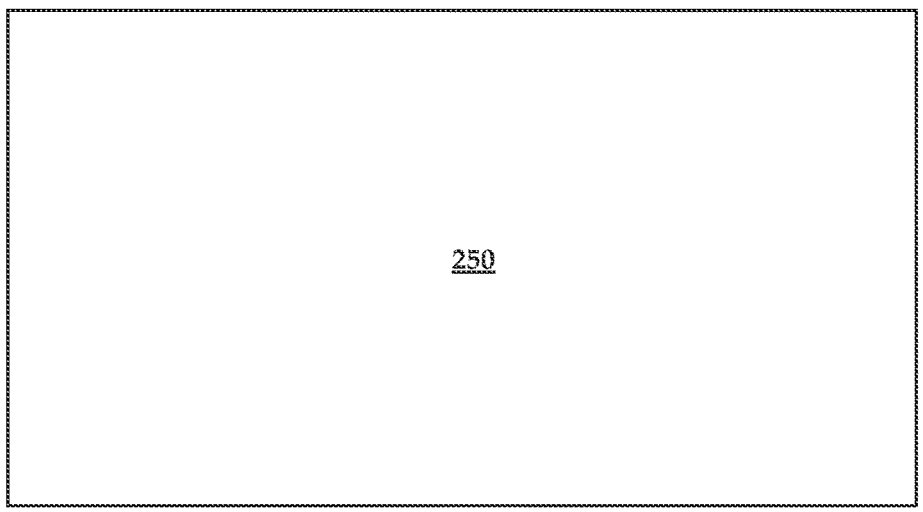
FIG. 8B is a schematic diagram of a simulated environment in the first stage of operation prior to the real-to-sim training phase, according to the teachings presented herein.

A Global Navigation Satellite System (GNSS) satellite 218 and an RTK tower 220 are remotely positioned to the lawn 202. The GNSS system includes GPS, Galileo, BeiDou, and GLONASS, and other similar systems. Due to the location of the GNSS satellite 218 and the RTK tower 220, an area of lawn adjacent to the building 210 is in a blind spot 222 without reception of the signals from the GNSS satellite 218 or potentially the RTK tower 220. It should be appreciated, however, that since RTK signal corrections are typically received via a strong direct signal or via cellular data, it is far less likely that this signal will degrade the performance of the smart lawnmower 10. FIG. 8B shows a simulated environment 250 that corresponds to the real-world environment 200 prior to the real-to-sim training phase. Accordingly, as shown, the simulated environment 250 is not yet built.

Figures 9A, 9B:
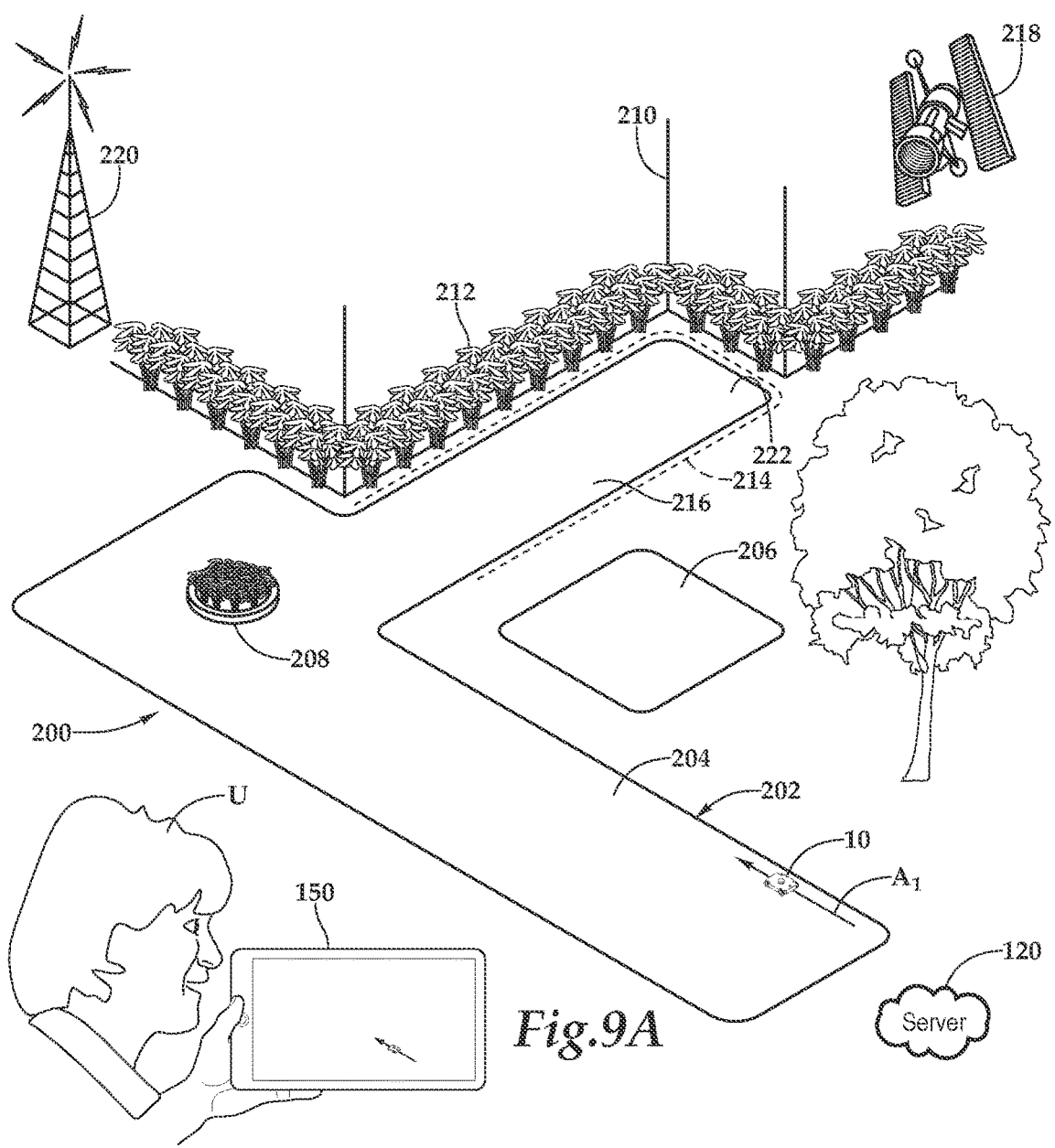
FIG. 9A is a schematic diagram of the real-world environment in a second stage of operation during the real-to-sim training phase.
FIG. 9B is a schematic diagram of the simulated environment in the second stage of operation during the real-to-sim training phase.

Referring now to FIG. 9A, the smart lawnmower 10 has been deployed on the lawn 202 within the real-world environment 200. The smart lawnmower 10 is operating in a real-to-sim training phase and a user U is utilizing the smart device 150, which as mentioned hereinabove, may take the form of a game controller, to communicate with the lawnmower 10. It should be appreciated, however, that the smart lawnmower 10 can be in communication with the cloud server 120. At this stage in the real-to-sim training phase, the user U is driving the smart lawnmower 10 around the perimeter of the lawn 202 to define the boundary of the lawn 202, as shown by arrow $A_1$. It should be appreciated that to drive the smart lawnmower 10, the user U may be walking behind the smart lawnmower 10, located on-site, or remotely. As the smart lawnmower 10 progresses along the path shown by arrow $A_1$, the smart lawnmower 10 determines its heading based on the inertial measurement unit and the position based on the location signalization received via the antenna from the GNSS satellite 218 and the RTK tower 220, for example. It should be appreciated, however, that in some applications, the GNSS satellite 218 may provide location signalization for both heading and position or, also, within the teachings presented herein, the heading and position may be provided by a different technology. This location or series of locations as the smart lawnmower 10 advances under the direction of the user U undergo a coordinate transformation where the location is transformed into coordinates in the simulated environment 250, which is shown in corresponding FIG. 9B, by line $L_1$.

Figure 10A:
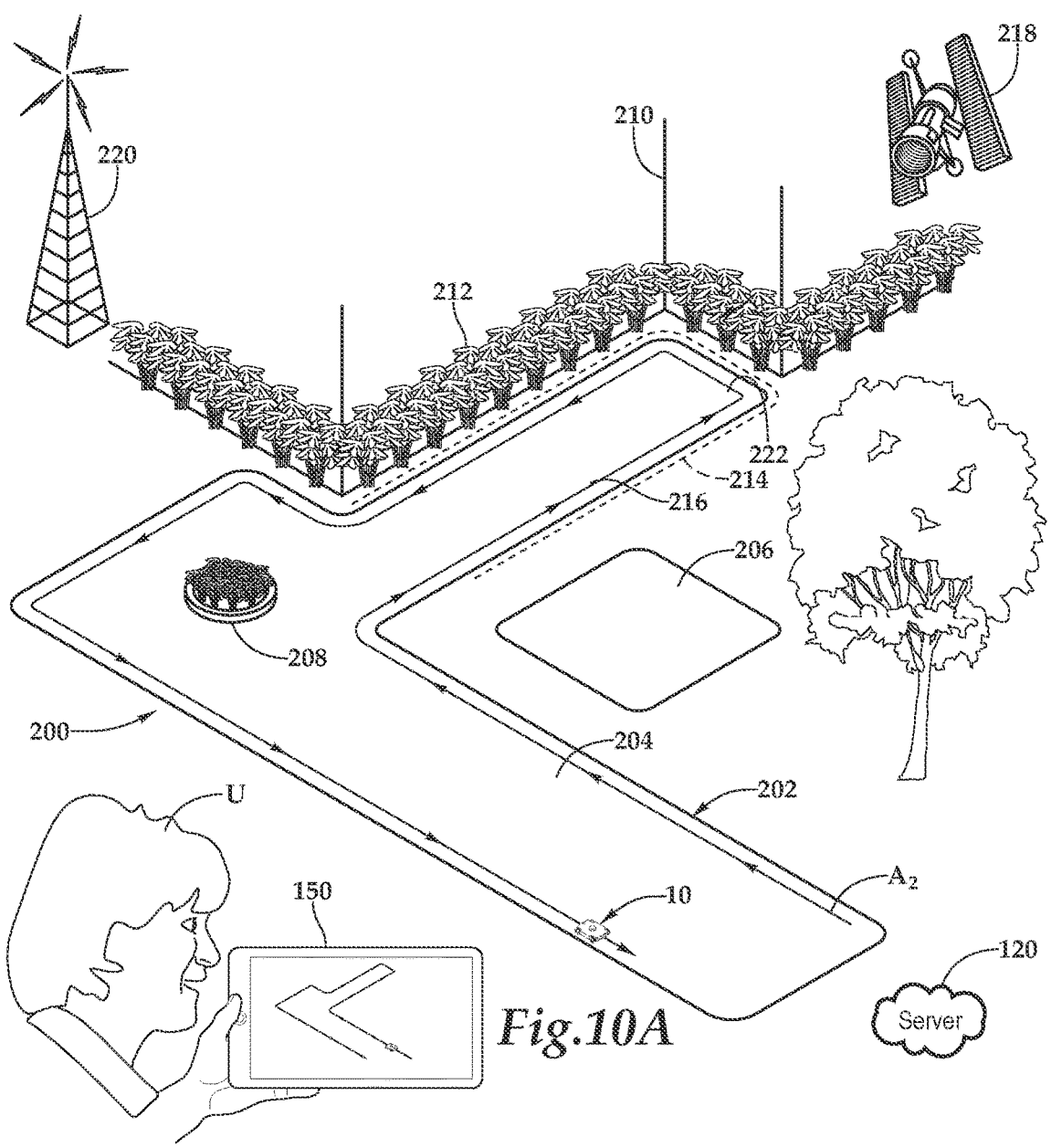
FIG. 10A is a schematic diagram of the real-world environment in a third stage of operation during the real-to-sim training phase.
Figure 10B:
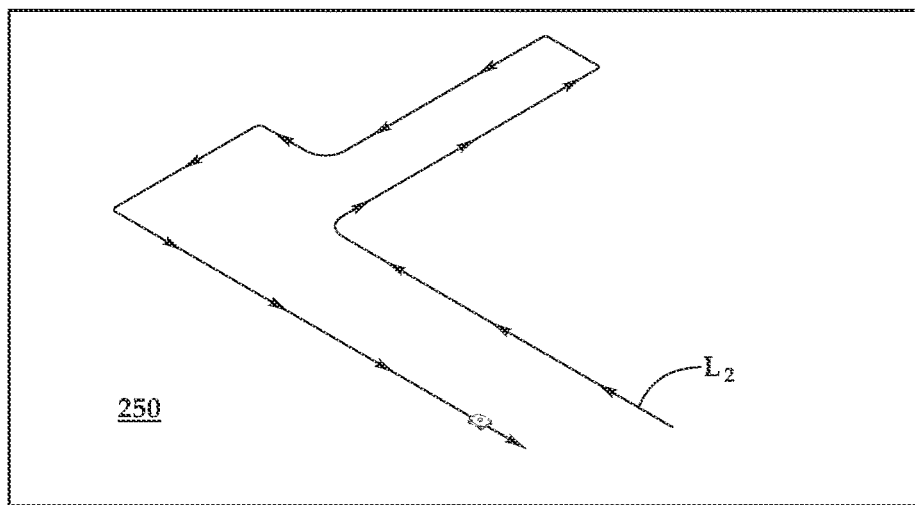
FIG. 10B is a schematic diagram of the simulated environment in the third stage of operation during the real-to-sim training phase.

Referring now to FIG. 10A, during the real-to-sim training phase, the smart lawnmower 10 has advanced along almost the entire perimeter of the body 204 of the lawn 202, as shown by arrow $A_2$. As previously discussed, as the smart lawnmower 10 advances under the direction of the user U, the smart lawnmower 10 determines its heading based on inertial measurement unit and the position based on location signalization received via the antenna from the GNSS satellite 218 and the RTK tower 220, for example. These series of locations undergo a coordinate transformation where the location is transformed into coordinates in the simulated environment 250, which is shown in corresponding FIG. 10B, by line L2. In FIG. 10A, the smart lawnmower 10 was steered along the perimeter of the panhandle portion 216 of the body 204 of the lawn 202 above electronic boundary wire 214 in the blind spot 222. In some embodiments, the smart device 10 may use the electronic boundary wire 214—particularly if the electronic boundary wire 214 coincides fully with the perimeter—to guide the smart device 10. The sensor 46 of the smart lawnmower 10, in some embodiments, senses the electronic boundary wire 214.

Figure 11A:
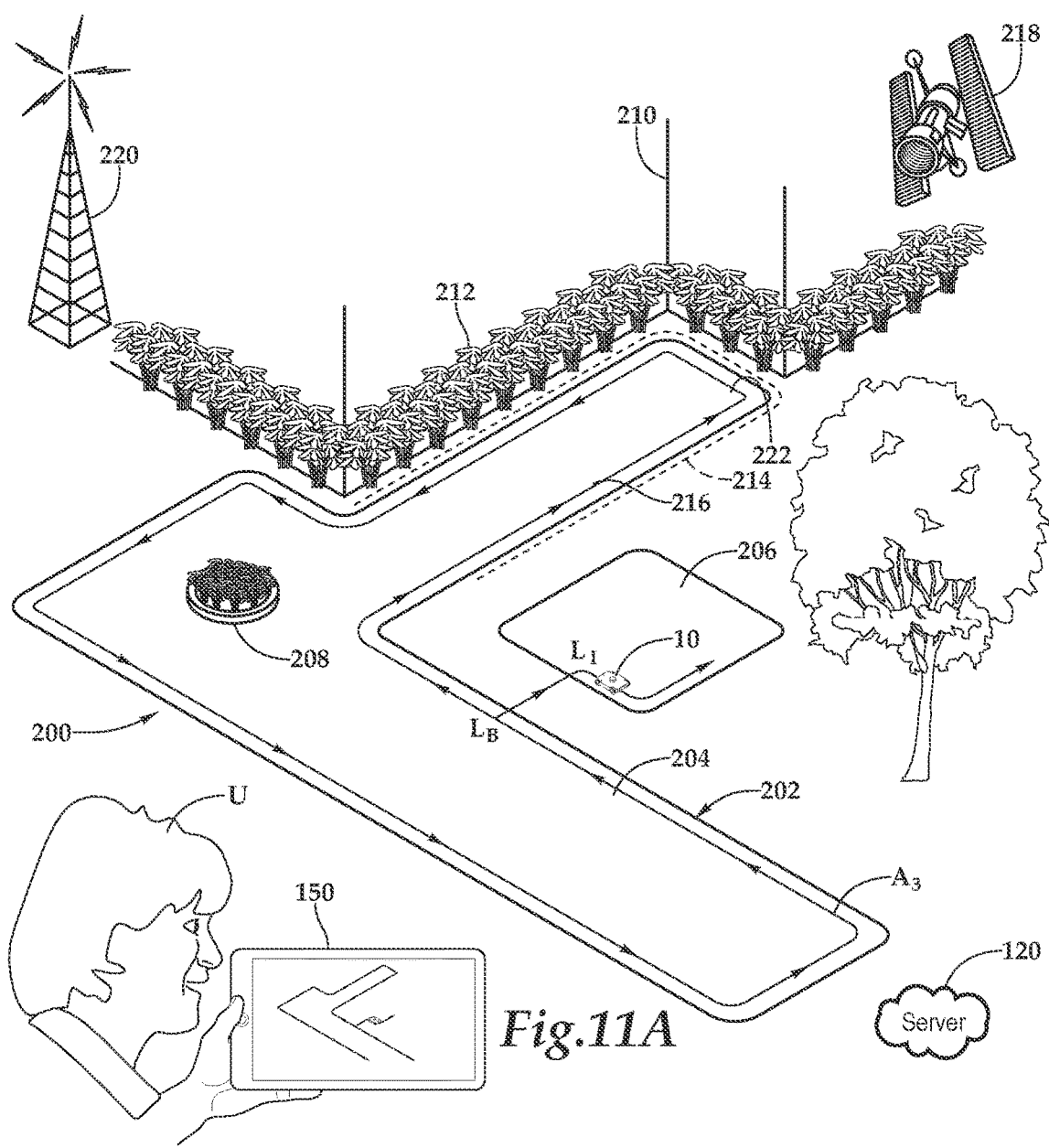
FIG. 11A is a schematic diagram of the real-world environment in a fourth stage of operation during the real-to-sim training phase.
Figure 11B:
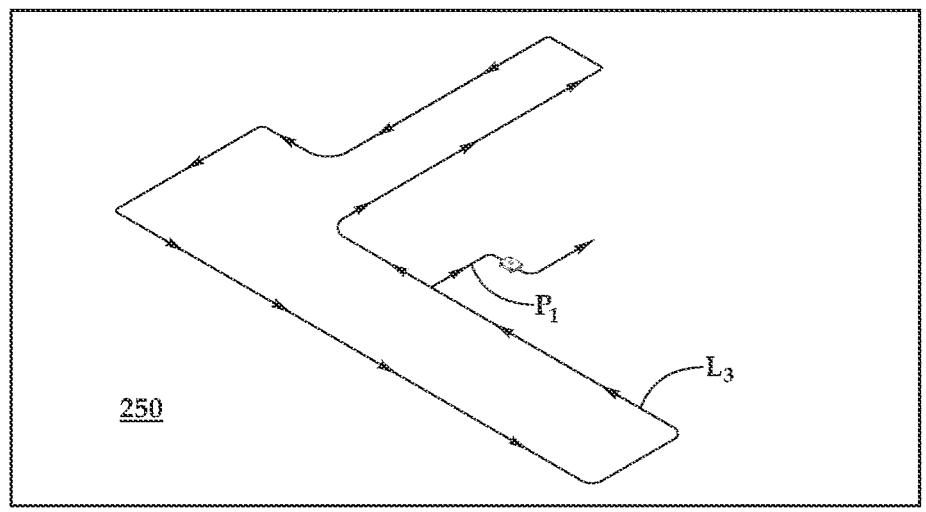
FIG. 11B is a schematic diagram of the simulated environment in the fourth stage of operation during the real-to-sim training phase.

Referring now to FIG. 11A, continuing to discuss the real-to-sim training phase, the smart lawnmower 10 has advanced along the entire perimeter of the body 204 of the lawn 202, as shown by arrow $A_3$. As previously discussed, as the smart lawnmower 10 advances under the direction of the user U, the smart lawnmower 10 determines its heading based on inertial measurement unit 80 and position based on the location signalization received via the antennas from the GNSS satellite 218 and the RTK tower 220, for example. These series of locations undergo a coordinate transformation where the location is transformed into coordinates in the simulated environment 250, which is shown in corresponding FIG. 11B, by line $L_3$. Further, as shown in FIG. 11A, the smart lawnmower has been piloted around to the island 206 while crossing from location $L_B$ to location $L_P$, as designated by the user U. This, in turn, corresponds with the path $P_1$ designated in FIG. 11B by the user U. In particular, the user U only wants the smart lawnmower 10 to use path P1 to go back-and-forth between the body 204 and the island 206.

Figure 12A:
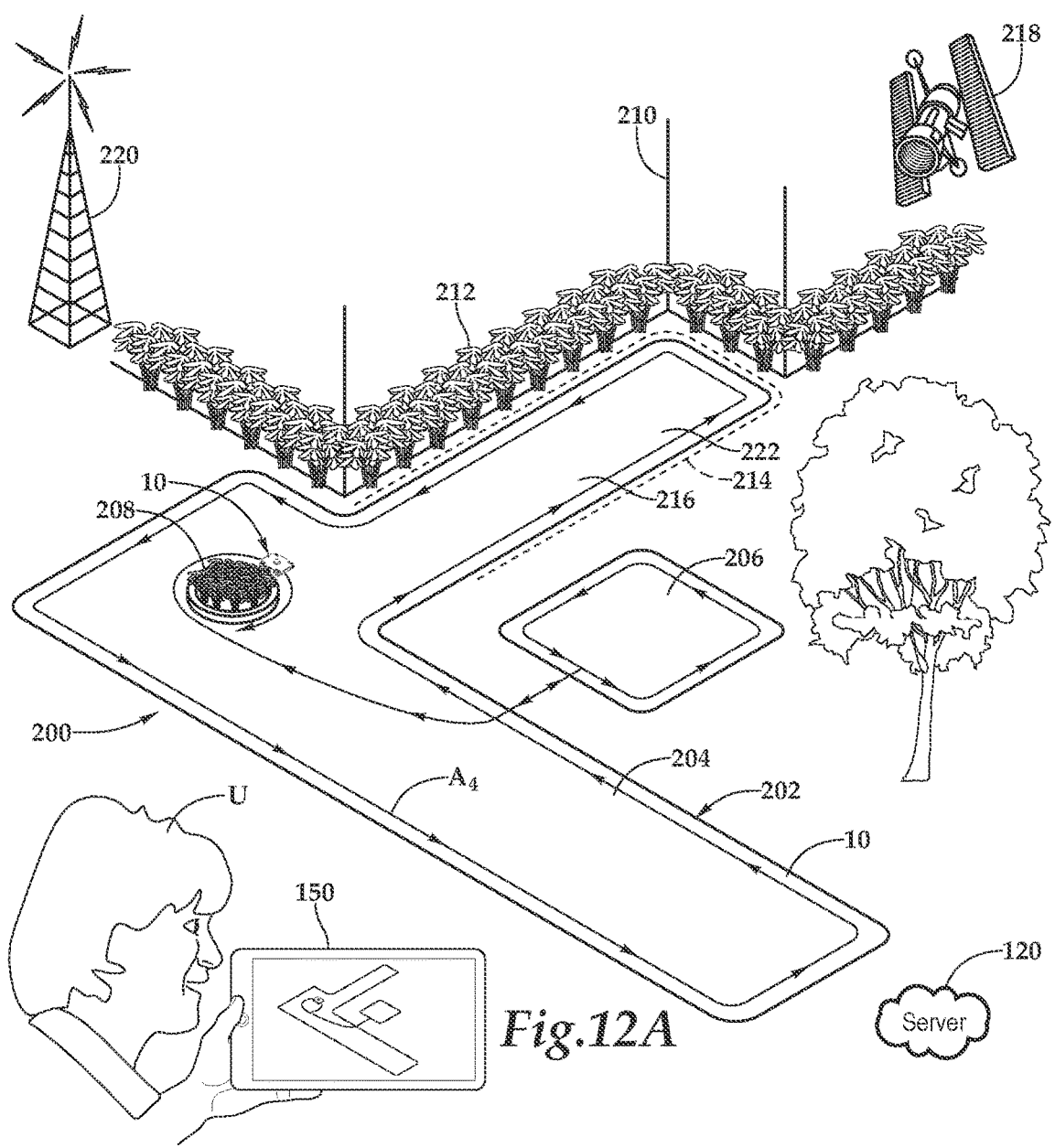
FIG. 12A is a schematic diagram of the real-world environment in a fifth stage of operation at the conclusion of the real-to-sim training phase.
Figure 12B:
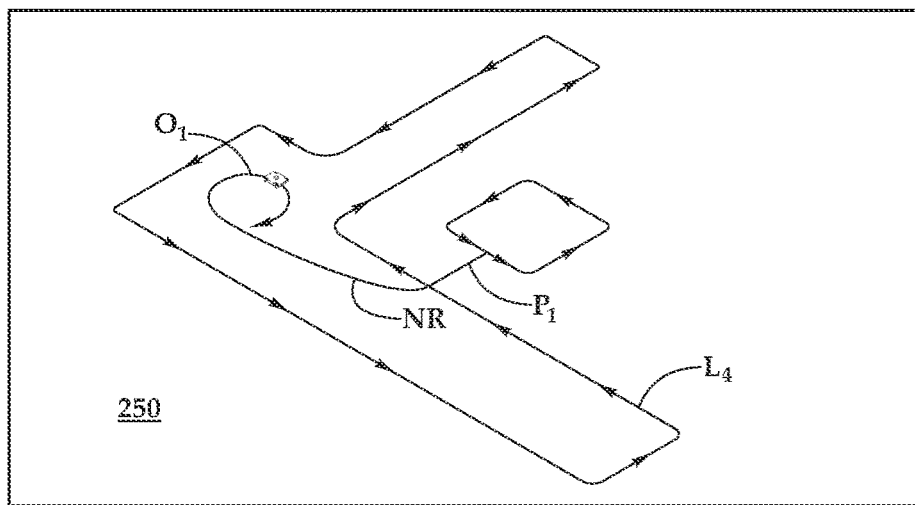
FIG. 12B is a schematic diagram of the simulated environment in the fifth stage of operation at the conclusion of the real-to-sim training phase.

Referring now to FIG. 12A, continuing to discuss the real-to-sim training phase, the smart lawnmower 10 has advanced along the entire perimeter of the body 204 of the lawn 202, as shown by arrow $A_4$ and advanced along the entire perimeter of the island 206. As previously discussed, as the smart lawnmower 10 advances under the direction of the user U, the smart lawnmower 10 determines its heading based on inertial measurement unit 80 and the position based on location signalization received via the antennas from the GNSS satellite 218 and the RTK tower 220. These series of locations undergo a coordinate transformation where the location is transformed into coordinates in the simulated environment 250, which is shown in corresponding FIG. 12B, by line $L_4$. Further, as shown in FIG. 12A, the smart lawnmower has been piloted to the flower garden 208 and therearound in response to the user U identifying the flower garden as an object that is something not to mow. In the corresponding simulated environment 250, the NR designation indicates a not relevant line and the flower garden is designated object $O_1$.

Figure 13A:
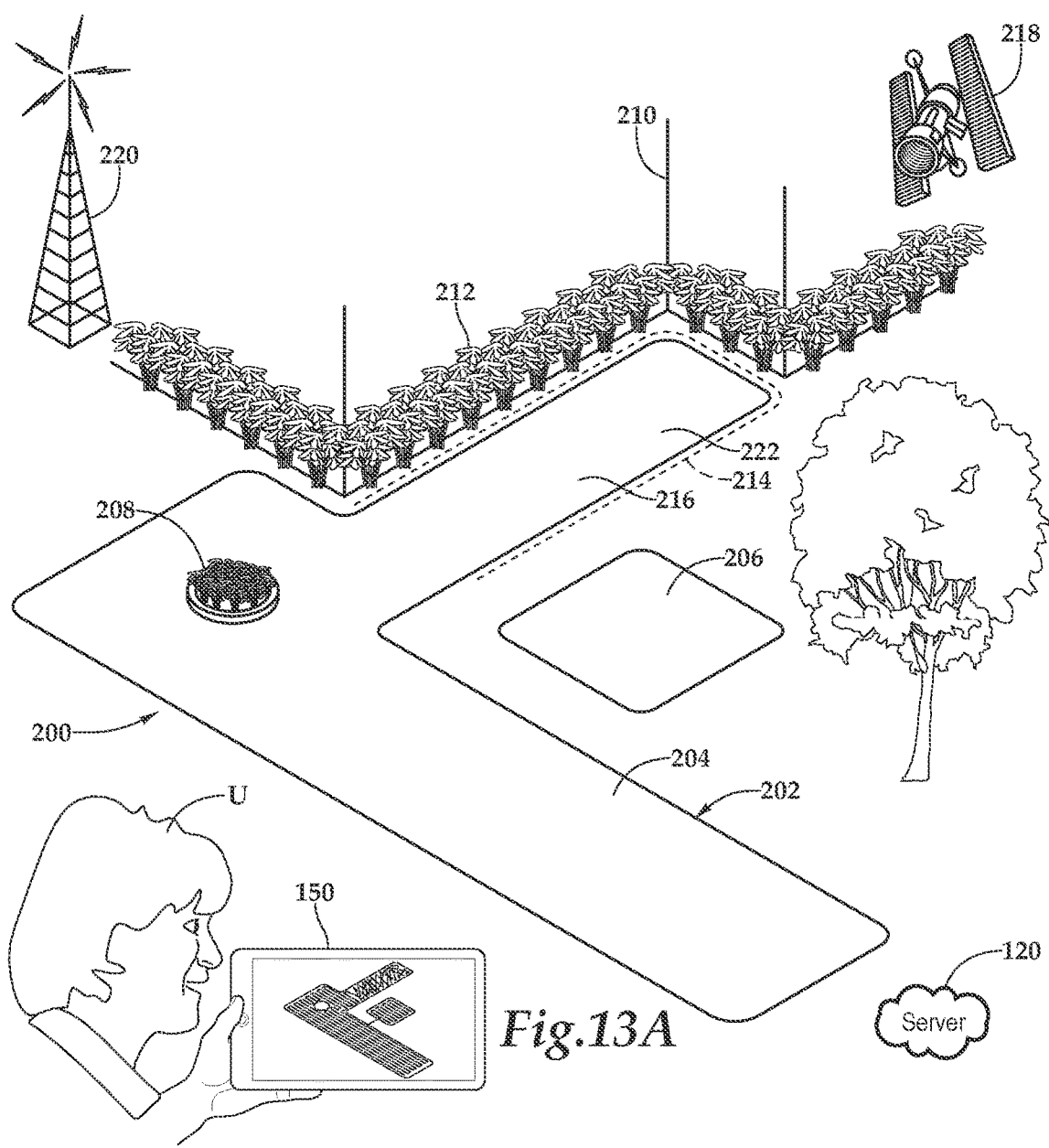
FIG. 13A is a schematic diagram of the real-world environment in a sixth stage of operation during consideration of a mowing policy.
Figure 13B:
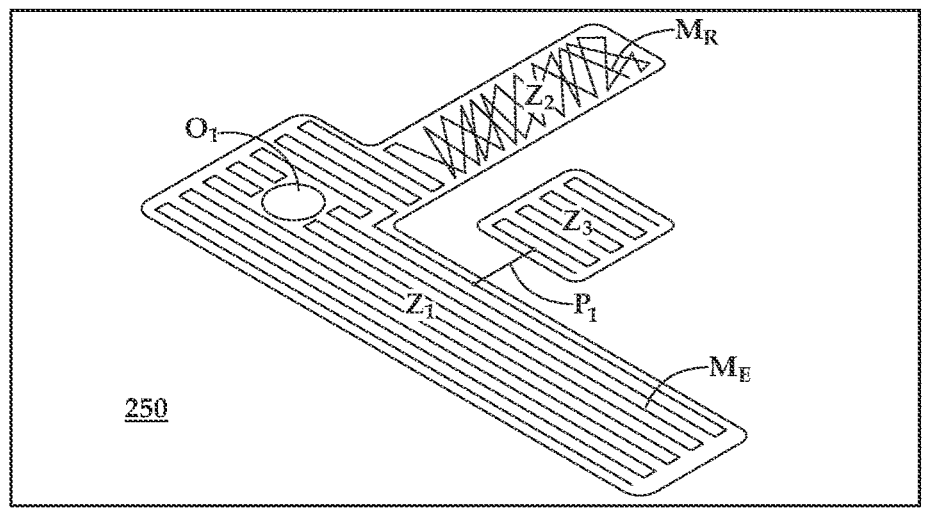
FIG. 13B is a schematic diagram of the simulated environment in the sixth stage of operation during consideration of the mowing policy.

Referring now to FIG. 13A, the real-to-sim training phase is complete and the simulated environment 250 is fully created. Now, as shown in FIG. 13B, mowing policy is designated that identifies fixed zones and float zones with zones $Z_1$, $Z_3$ being fixed zones because of the adequate reception of the signals from the GNSS satellite 218 and the RTK tower 220. A zone $Z_2$ does not have reception from either the GNSS satellite 218 and the RTK tower 220 because of the close proximity of the building 210. This blind spot 222 is zone $Z_2$. A mowing pattern ME based on optimization of time and efficiency is selected for zones $Z_1$, $Z_3$. As zone $Z_2$ is in a blind spot, a random mowing pattern MR is selected since the smart lawnmower 10 will not be able to utilize the location signalization received via the antennas from the GNSS satellite 218 and the RTK tower 220. Rather, in the blind spot 222, the smart lawnmower 10 will move randomly (or use any mowing pattern deemed efficient in the situation), but smartly to efficiently finish the job while keeping track of where the smart lawnmower 10 has traveled to know which area and areas have been mowed, between edges of the electronic boundary wire 214 until the panhandle portion 216 is completely mowed. That is, in the illustrated embodiments, in blind spots the system will demote the utilization of GNSS positioning and use wire sensing as a method of limiting the travel of the robot and for instructing the robot when to turn back towards the inside of the mowing area (float zone).

Figure 14A:
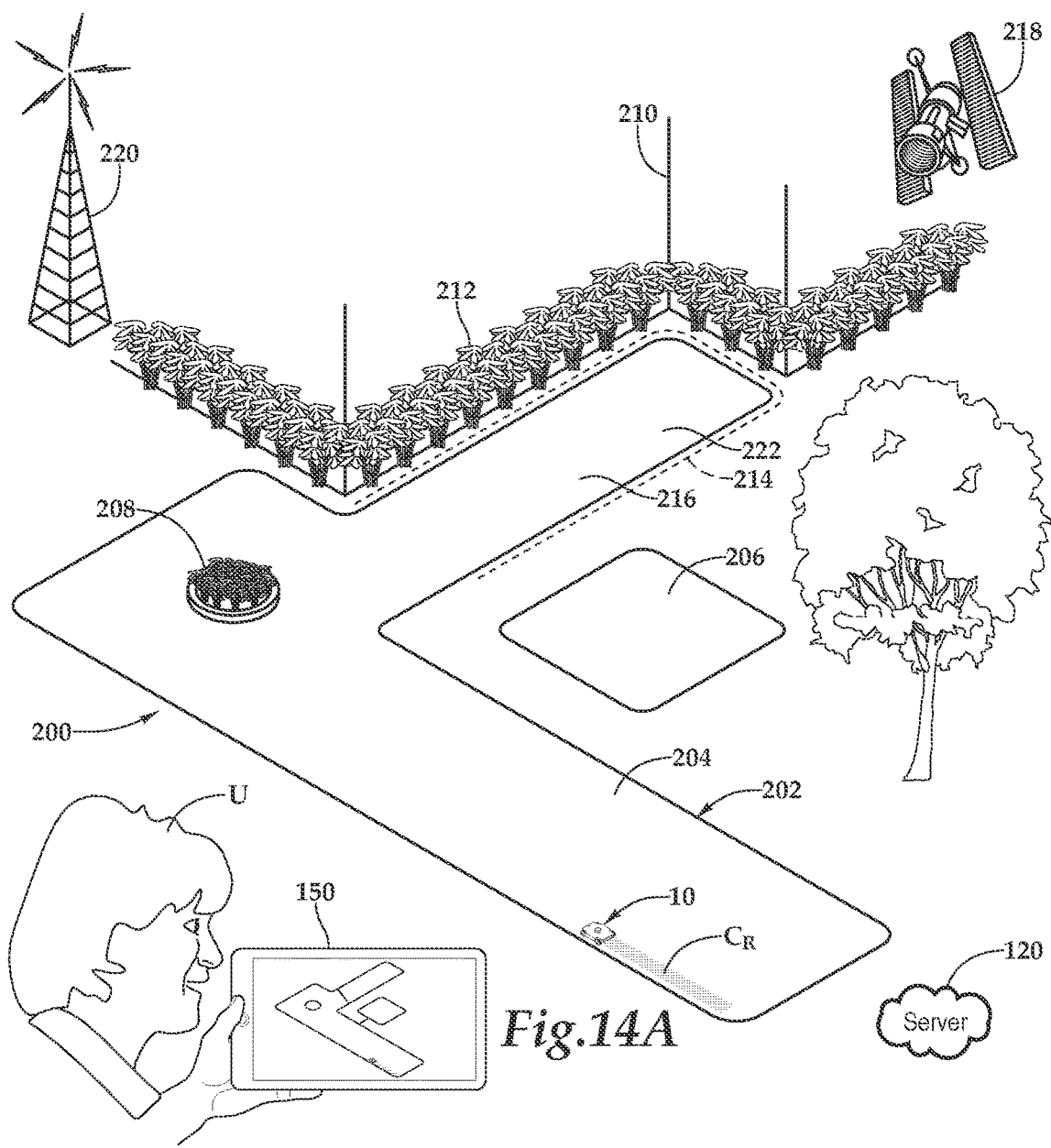
FIG. 14A is a schematic diagram of the real-world environment in a seventh stage of operation during a sim-to-real mowing phase.
Figure 14B:
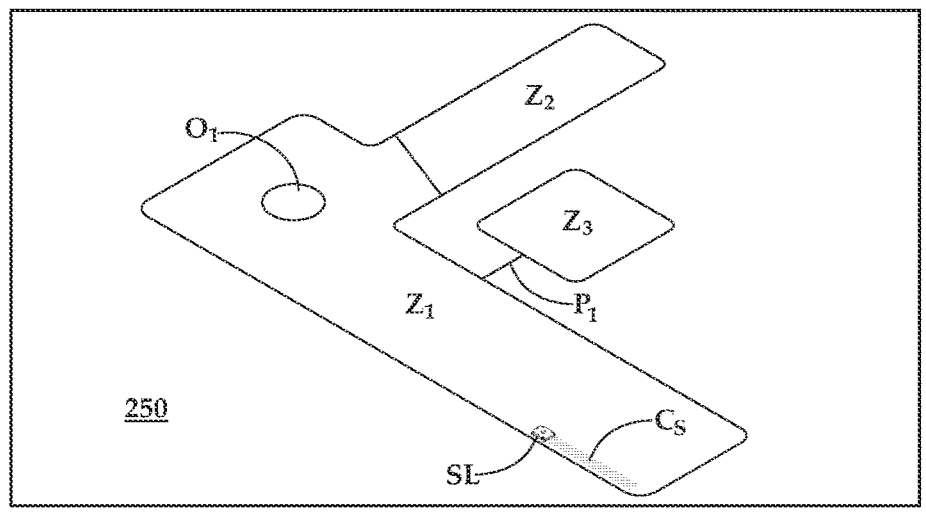
FIG. 14B is a schematic diagram of the simulated environment in the seventh stage of operation during the sim-to-real mowing phase.

Referring to FIG. 14A and FIG. 14B, the smart lawnmower 10 is operating during a sim-to-real mowing phase, wherein in the real-world environment 200, the smart lawnmower 10 is mowing the lawn 202 as shown by cut grass CR. Correspondingly, an icon of the smart lawnmower SL shows cut grass Cs. As previously discussed, in the sim-to-real mowing phase, the simulated environment and the real-world environment are synchronized by the smart lawnmower 10 receiving in real-time semantic information from the real-world environment such that the smart lawnmower makes decisions in the simulated environment for realization in the real-world environment. Further, in the sim-to-real mowing phase, as shown, the smart lawnmower applies a mowing policy in the simulated environment to control the cutting subsystem and the drive subsystem in the real-world environment.

Figure 15A:
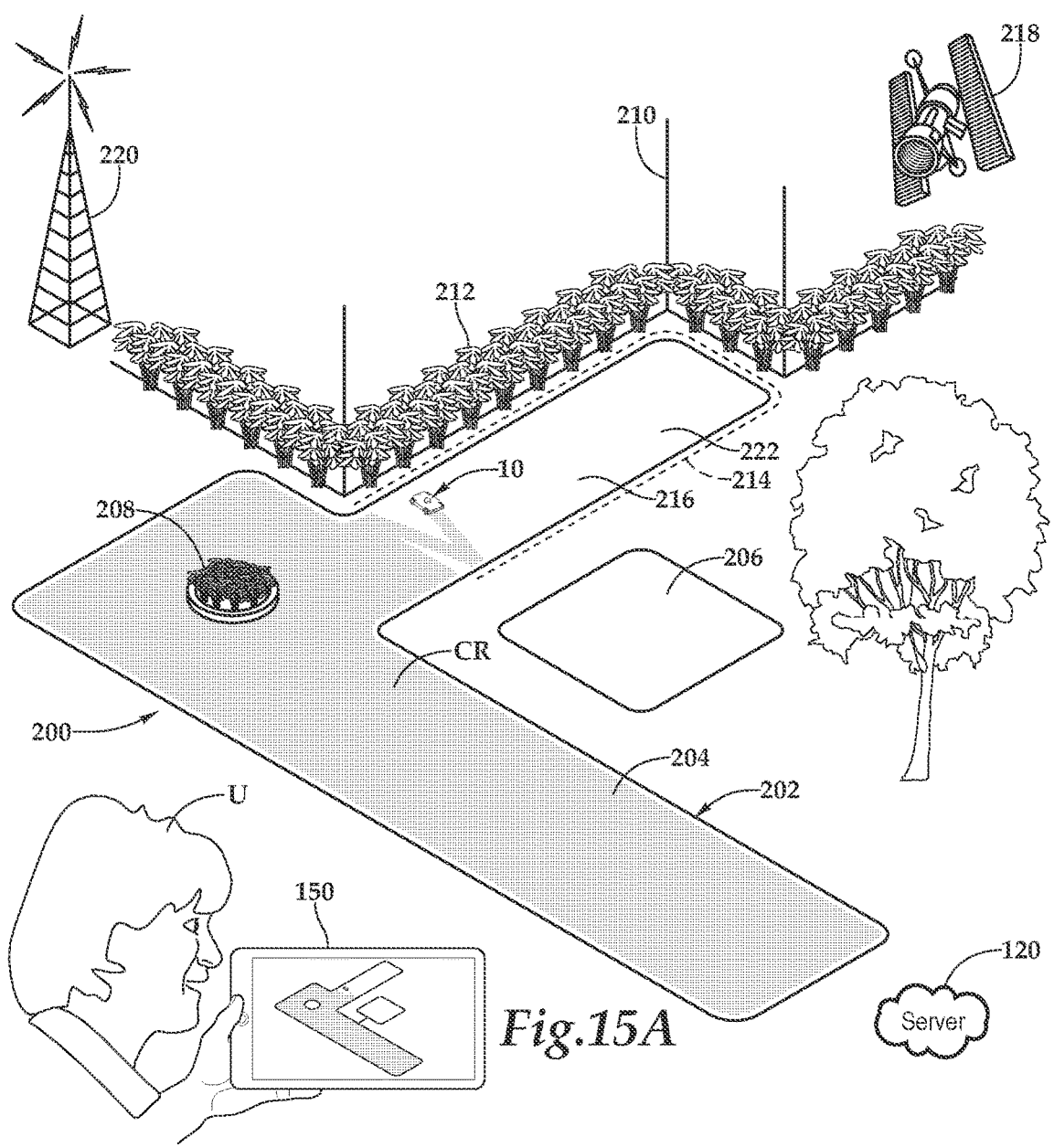
FIG. 15A is a schematic diagram of the real-world environment in an eighth stage of operation during the sim-to-real mowing phase.
Figure 15B:
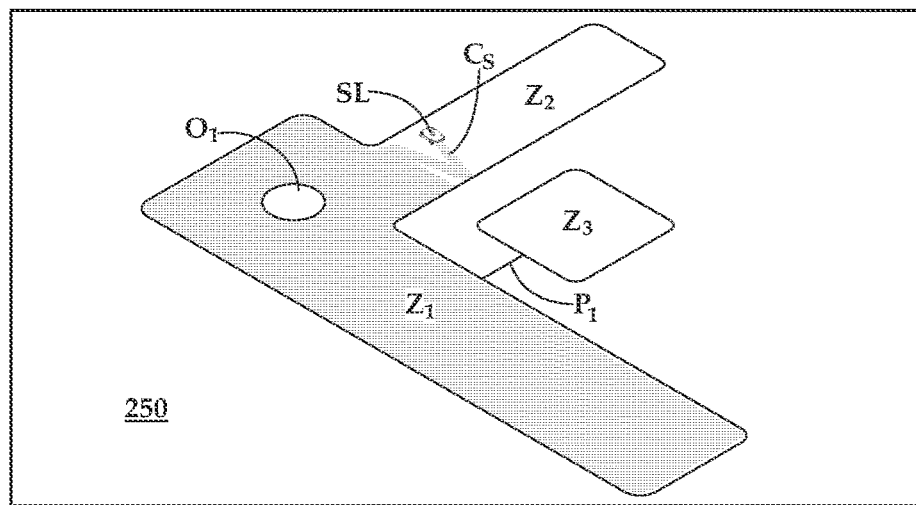
FIG. 15B is a schematic diagram of the simulated environment in the eighth stage of operation during the sim-to-real mowing phase.
Figure 16A:
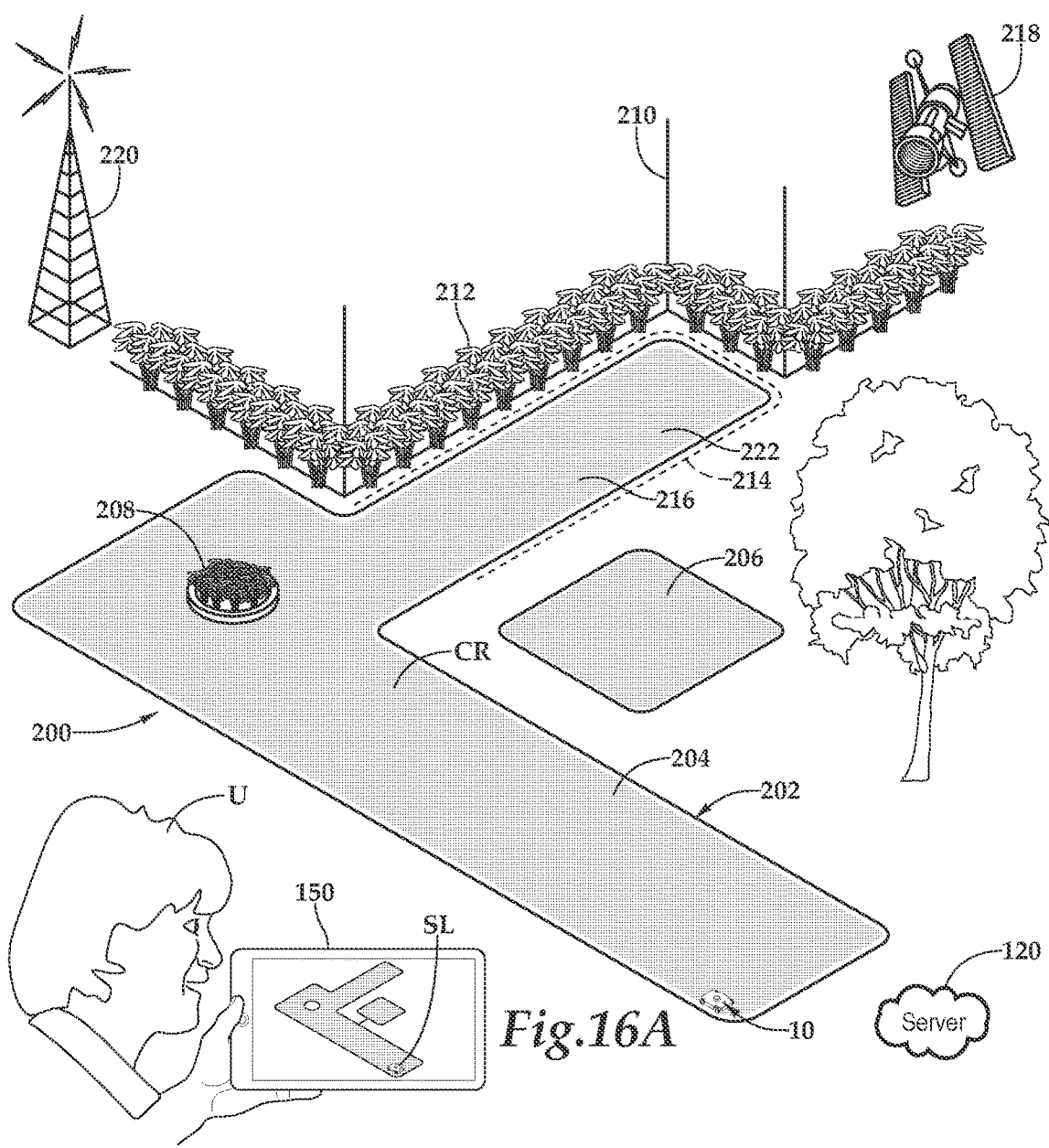
FIG. 16A is a schematic diagram of the real-world environment in a ninth stage of operation during the sim-to-real mowing phase.
Figure 16B:
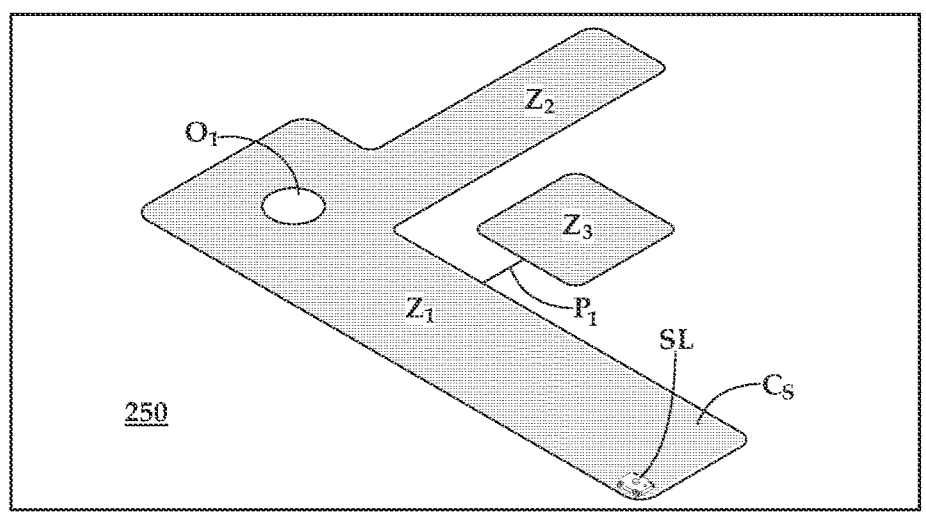
FIG. 16B is a schematic diagram of the simulated environment in the ninth stage of operation during the sim-to-real mowing phase.

Continuing the sim-to-real mowing phase in FIG. 15A, the smart lawnmower 10 in the real-world environment 200 has is a schematic diagram of the real-world environment is continuing to mow in an efficient manner and avoided the flower garden 208. As the panhandle portion 216 is in a blind spot 222, a random mowing pattern is undertaken where the smart lawnmower 10 uses the sensor 46 to identify the edges of the electronic boundary wire 214 until the panhandle portion 216 is completely mowed. It should be appreciated that the sensor 46, in some embodiments, may detect an underground boundary wire or an electronic boundary defined by optical markers or via time-of-flight data, for example. Continuing the sim-to-real mowing phase in FIGS. 16A and 16B, wherein the mowing has completed and the smart lawnmower 10 is returning to its designated location.

Figure 17:
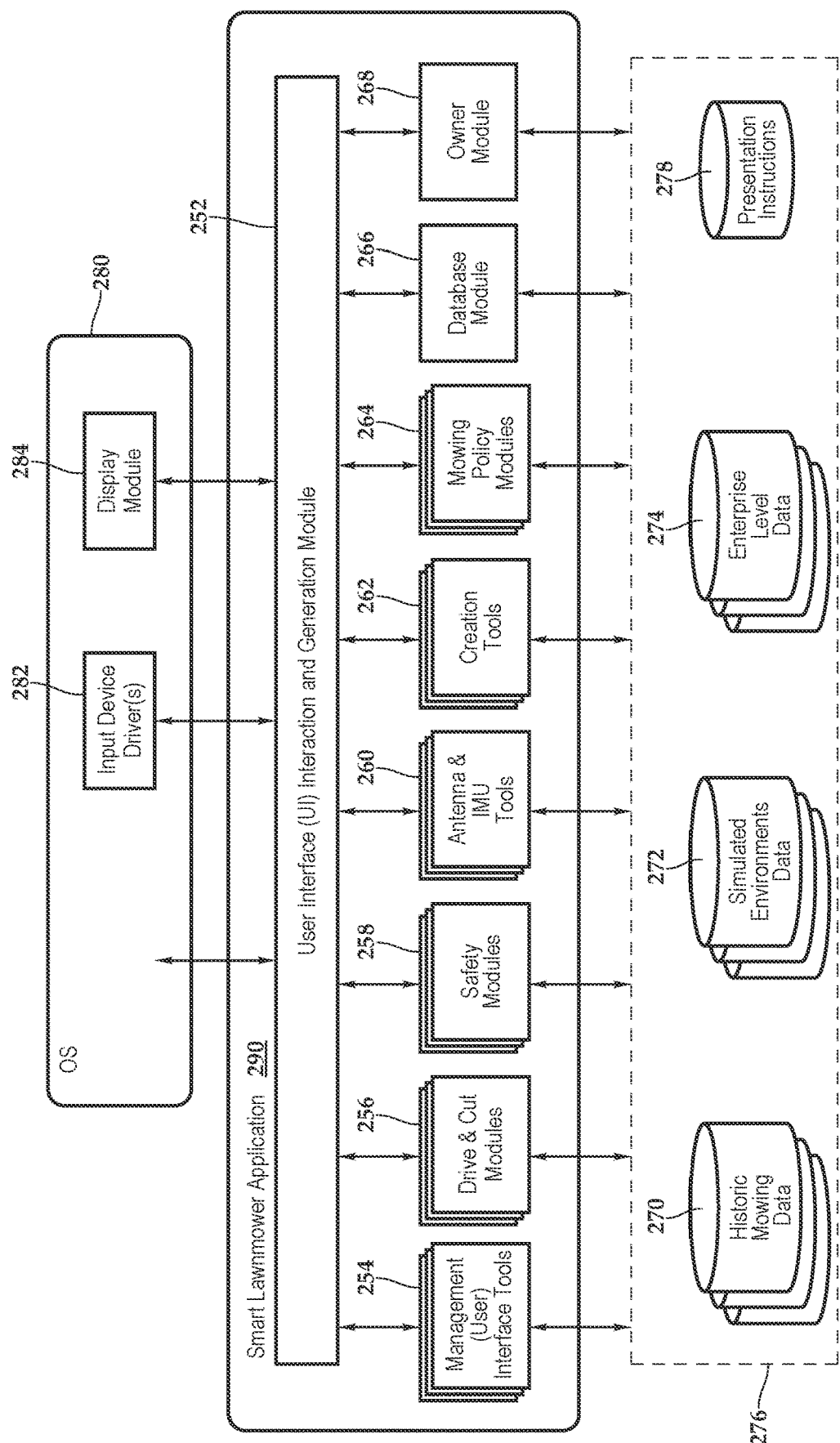
FIG. 17 is a conceptual module diagram depicting a software architecture of a smart lawnmower application of some embodiments.

FIG. 17 conceptually illustrates the software architecture of a smart lawnmower application 290 of some embodiments that may be utilized to control the smart lawnmower 10. In some embodiments, the smart lawnmower application 290 is a stand-alone application or is integrated into another application, while in other embodiments the application might be implemented within an operating system 280. Furthermore, in some embodiments, the smart lawnmower application 290 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The smart lawnmower application 290 includes a user interface (UI) interaction and generation module 252, management (user) interface tools 254, drive and cut modules 256, safety modules 258, antenna and IMU tools 260, creation tools 262, mowing policy modules 264, a database module 266, and an owner module 268. The smart lawnmower application 290 has access to certain storage 276, which in one embodiment, may include historic mowing data 270, simulated environments data 272, enterprise level data 274, and presentation instructions 278, which presents instructions for the operation of the smart lawnmower application 290. In some embodiments, storages 270, 272, 274, 278 are all stored in one physical storage. In other embodiments, the storages 270, 272, 274, 278 are in separate physical storages, or one of the storages is in one physical storage while the other is in a different physical storage.

The various storages, in one implementation, provide a database of all pertinent information required for operation and historical information of properties and the smart lawnmower 10. The historic mowing data 270 may be all information concerning historic mows, including mowing patterns used, identification of properties, and smart lawnmowers utilized. In some embodiments, the historic mowing data 270 also provides a mechanism whereby users may adjust the pattern angle of mowing and the striping pattern, whether various crisscross patterns or random or concentric rings, for example. With the information in the historic mowing data 270, the smart lawnmower 10 may preselect a pattern of striping in a different direction to avoid making ruts in the grass from the wheels going over the same areas all the time.

The simulated environments data 272 includes various data about all of the simulated environments previously created. The enterprise level data 274 includes all the information for multi-property projects, including mowing projects in neighborhoods or multi-tenant projects where a shared-access arrangement provides access across multiple customers. The UI interaction and generation module 252 generates a user interface that allows the end user to specify parameters, such as, for example, mowing patterns, angle of striping, and cutting overlaps, that may be utilized to generate various reports and notifications, as well as change the behavior of the smart lawnmower, when required.

In the illustrated embodiment, FIG. 17 also includes the operating system 280 that includes input device driver(s) 282 and a display module 284. In some embodiments, as illustrated, the input device driver(s) 282 and display module 284 are part of the operating system 280 even when the smart lawnmower application 290 is an application separate from the operating system 280. The input device driver(s) 282 may include drivers for translating signals from a keyboard, mouse, touchpad, tablet, touch screen, gyroscope, or accelerometer, for example. A user may use one or more of these input device driver(s) 282, which send signals to their corresponding device driver, in combination with the display module 284 to interact with the smart lawnmower application 290. The device driver then translates the signals into user input data that is provided to the UI interaction and generation module 252.

Figure 18A:
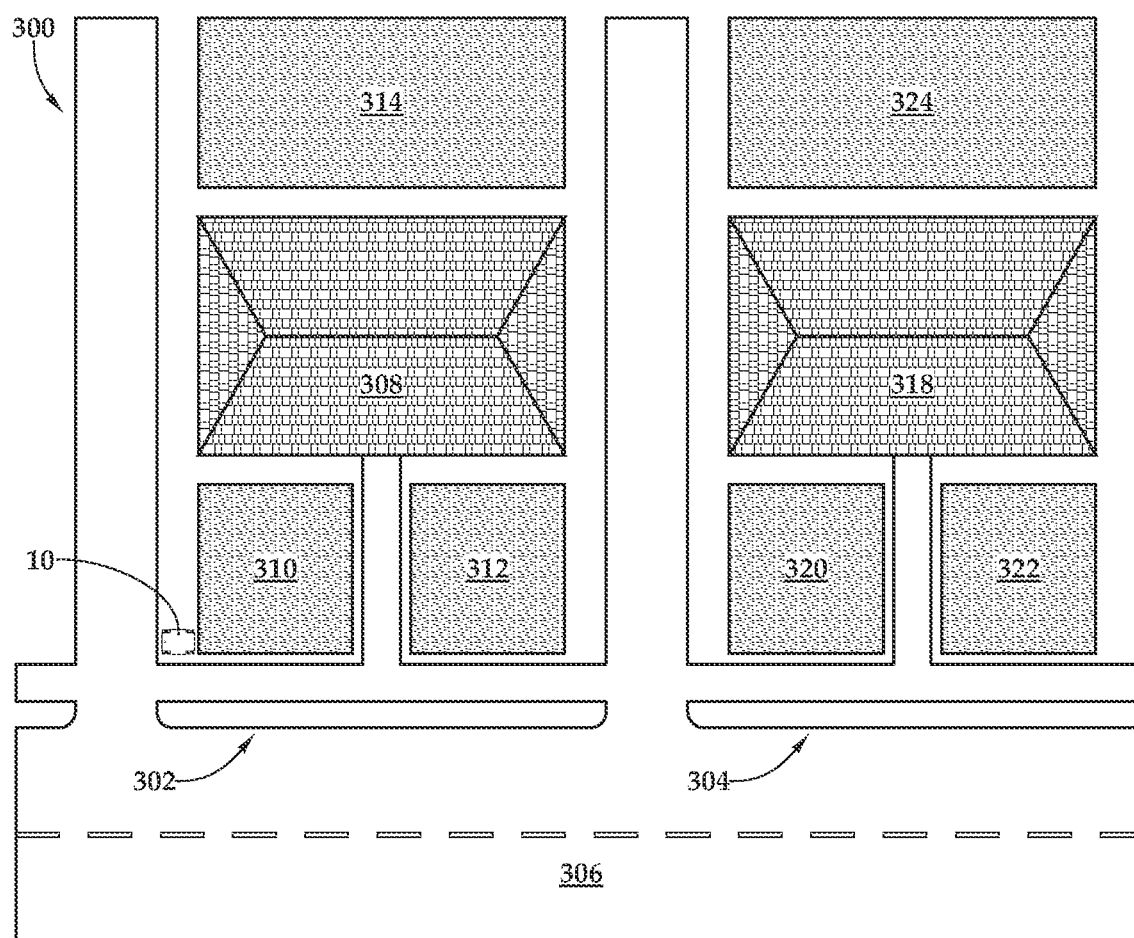
FIG. 18A is a schematic diagram of the real-world environment in a tenth stage of operation following the sim-to-real mowing phase.
Figure 18B:
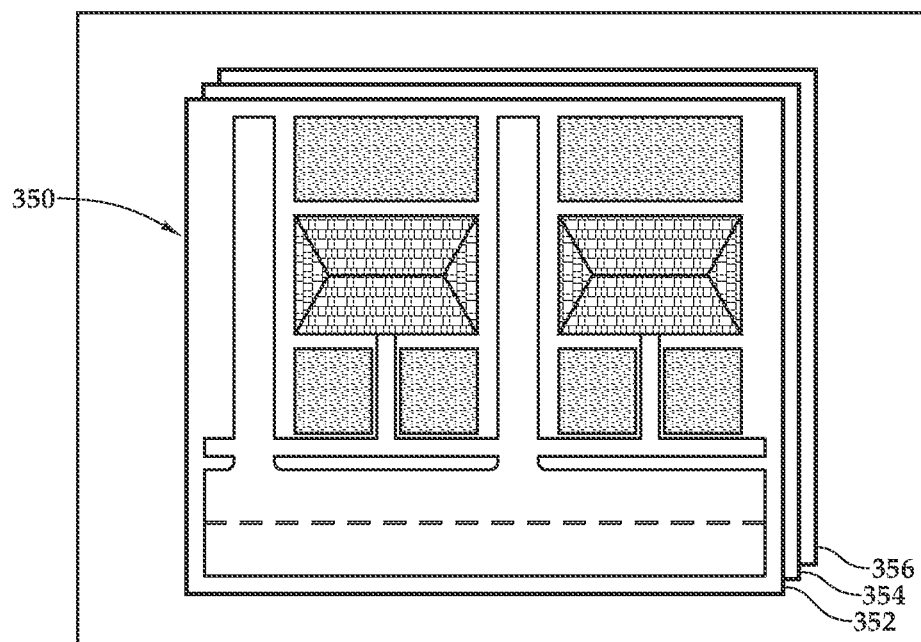
FIG. 18B is a schematic diagram of the simulated environment in the tenth stage of operation following the sim-to-real mowing phase.

Referring now to FIG. 18A and FIG. 18B, in a real-world environment 300 multiple properties 302, 304 exist along a street 306 and the smart lawnmower 10 may be utilized to efficiently mow multiple properties 302, 304. The smart lawnmower 10 may determine the most efficient route to mow for a house 308 including front lawn portions 310, 312 and a rear lawn 314 and to mow for a house 318 including front lawn portions 320, 322 and a rear lawn 324. As shown in a simulated world 350, multiple properties 352, 354, 356 may all be mowed in an efficient manner by the smart lawnmower 10. With the multiple properties 352, 354, 356 having lawns to-be-serviced, each lawn-to-be-serviced may include a location and completion time. The smart lawnmower 10 may access a database having this information and compute a best route between the lawns-to-be-serviced to maximize the number of the lawns-to-be-serviced in day.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A smart lawnmower comprising:
   a housing including an inertial measurement unit, a sensor, a processor and memory therein communicatively interconnected in a busing architecture;
   a cutting subsystem secured to the housing, the cutting subsystem communicatively interconnected to the busing architecture, the cutting subsystem configured to cut lawn;
   a drive subsystem secured to the housing, the drive subsystem communicatively interconnected to the busing architecture, the drive subsystem configured for locomotion and steering of the smart lawnmower;
   an antenna secured to the housing and communicatively interconnected to the busing architecture, the antenna having a known spaced relationship to the cutting subsystem;
   the memory accessible to the processor, the memory including first processor-executable instructions that, when executed, cause the processor to:
      in a real-to-sim training phase, construct a simulated environment corresponding to a mowing-relevant portion of a real-world environment relative to semantic information, the semantic information being information that the smart lawnmower has about the real-world environment via at least one of the inertial measurement unit, the sensor, user input, and location signalization from the antenna,
      upon the creation of the simulated environment, applying a mowing policy to the simulated environment, the mowing policy including a designation within the simulated environment of at least one of a fixed zone and a floating zone, a fixed zone being an area in the simulated environment corresponding to an area in the real-world environment having reception of the location signalization, the floating zone being an area in the simulated environment corresponding to an area in the real-world environment having diminished reception of the location signalization, and
      in a sim-to-real mowing phase, apply the mowing policy to control the cutting subsystem and the drive subsystem in response to the semantic information; and
   the memory further comprises second processor-executable instructions that, when executed, cause the processor to:
      upon reaching a threshold of turning movements executed by the drive subsystem, record a first position in a fixed zone at a first location,
      record a second position in the fixed zone at a second location, and
      calibrate the inertial measurement unit based on a heading derived from the first position and the second position.

2. The smart lawnmower as recited in claim 1, wherein the inertial measurement unit provides the processor an orientation of the smart lawnmower with respect to the drive subsystem.

3. The smart lawnmower as recited in claim 1, wherein the location signalization further comprises signalization selected from the group consisting of GNSS signalization, precise point positioning signalization, time-of-flight-based signalization, carrier-based ranging signalization, and wireless signalization.

4. The smart lawnmower as recited in claim 3, wherein the carrier-based ranging further comprises real-time kinematic positioning.

5. The smart lawnmower as recited in claim 1, wherein the mowing policy includes a mowing pattern.

6. The smart lawnmower as recited in claim 1, wherein the mowing policy includes a mowing pattern that avoids ruts based on previously selected mowing patterns.

7. The smart lawnmower as recited in claim 1, wherein the mowing policy provides a mowing pattern that completes mowing the simulated environment in a minimum amount of time.

8. The smart lawnmower as recited in claim 1, wherein the fixed zone further comprises an area of high confidence in a location of the cutting subsystem.

9. The smart lawnmower as recited in claim 1, wherein the floating zone further comprises an area of lower confidence in a location of the cutting subsystem.

10. The smart lawnmower as recited in claim 1, wherein the sensor further comprises an electronic boundary wire detector.

11. The smart lawnmower as recited in claim 1, wherein the sensor further comprises an instrument selected from the group consisting of time-of-flight sensors for electromagnetic waves and time-of-flight sensors for sound waves.

12. The smart lawnmower as recited in claim 1, wherein the memory further comprises processor-executable instructions that, when executed, cause the processor to:
render the simulated environment including simulated representations of physical objects in the real-world environment,
place the smart lawnmower at a location in the simulated environment, and
signal the drive subsystem based on the location of the cutting system in the simulated environment.

13. The smart lawnmower as recited in claim 1, wherein the memory further comprises processor-executable instructions that, when executed, cause the processor to:
record a boundary as the drive subsystem undertakes locomotion and steering of the smart lawnmower, and
update the simulated environment with obstructions detected by the sensor.

14. The smart lawnmower as recited in claim 1, wherein the memory further comprises processor-executable instructions that, when executed, cause the processor to:
provide a user interface including the simulated environment.

15. The smart lawnmower as recited in claim 1, wherein the memory further comprises processor-executable instructions that, when executed, cause the processor to:
provide a user interface including the simulated environment,
utilize a viewpoint function in the user interface to navigate the simulated environment,
select a mowing pattern, and
request a user verify an appearance of the selected mowing pattern using the viewpoint function.

16. The smart lawnmower as recited in claim 1, wherein a cloud-based server provides support to the smart lawnmower for execution of the first processor-executable instructions.

17. The smart lawnmower as recited in claim 1, wherein a smart device provides support to the smart lawnmower for execution of the first processor-executable instructions.

18. The smart lawnmower as recited in claim 4, wherein the memory further comprises processor-executable instructions that, when executed, cause the processor to:
design, based on user input, an edging and trimming plan within the simulated environment, and
output the edging and trimming plan.

19. A smart lawnmower comprising:
a housing including an inertial measurement unit, a sensor, a processor and memory therein communicatively interconnected in a busing architecture;
a cutting subsystem secured to the housing, the cutting subsystem communicatively interconnected to the busing architecture, the cutting subsystem configured to cut lawn;
a drive subsystem secured to the housing, the drive subsystem communicatively interconnected to the busing architecture, the drive subsystem configured for locomotion and steering of the smart lawnmower;
an antenna secured to the housing and communicatively interconnected to the busing architecture, the antenna having a known spaced relationship to the cutting subsystem;
the memory accessible to the processor, the memory including first processor-executable instructions that, when executed, cause the processor to:
in a real-to-sim training phase, construct a simulated environment corresponding to a mowing-relevant portion of a real-world environment relative to semantic information, the semantic information being information that the smart lawnmower has about the real-world environment via at least one of the inertial measurement unit, the sensor, user input, and location signalization received at the antenna, and
in a sim-to-real mowing phase, apply a mowing policy to control the cutting subsystem and the drive subsystem in response to the semantic information; and
the memory further comprises second processor-executable instructions that, when executed, cause the processor to:
upon reaching a threshold of turning movements executed by the drive subsystem, record a first position in a fixed zone at a first location,
record a second position in the fixed zone at a second location, and
calibrate the inertial measurement unit based on a heading derived from the first position and the second position.

20. A smart lawnmower comprising:
a housing including an inertial measurement unit, a sensor, a processor and memory therein communicatively interconnected in a busing architecture;
a cutting subsystem secured to the housing, the cutting subsystem communicatively interconnected to the busing architecture, the cutting subsystem configured to cut lawn;
a drive subsystem secured to the housing, the drive subsystem communicatively interconnected to the busing architecture, the drive subsystem configured for locomotion and steering of the smart lawnmower;
an antenna secured to the housing and communicatively interconnected to the busing architecture, the antenna having a known spaced relationship to the cutting subsystem; and
the memory accessible to the processor, the memory including first processor-executable instructions that, when executed, cause the processor to:
in a real-to-sim training phase, construct a simulated environment corresponding to a mowing-relevant portion of a real-world environment relative to semantic information, the semantic information being information that the smart lawnmower has about the real-world environment via at least one of the inertial measurement unit, the sensor, user input, and location signalization received at the antenna,
in a sim-to-real mowing phase, apply a mowing policy to control the cutting subsystem and the drive subsystem in response to the semantic information, and
in each of the real-to-sim training phase and the sim-to-real mowing phase, provide a user interface including the simulated environment; and
the memory further comprises second processor-executable instructions that, when executed, cause the processor to:

upon reaching a threshold of turning movements executed by the drive subsystem, record a first position in a fixed zone at a first location, record a second position in the fixed zone at a second location, and calibrate the inertial measurement unit based on a heading derived from the first position and the second position.

\* \* \* \* \*